United States Patent [19]
Kato

[11] 3,984,847
[45] Oct. 5, 1976

[54] ELECTRIC EYE EXPOSURE APPARATUS FOR USE IN A CAMERA HAVING A BLADED SHUTTER MECHANISM

[75] Inventor: Toshikazu Kato, Hachioji, Japan

[73] Assignee: Olympus Optical Co., Ltd., Tokyo, Japan

[22] Filed: Sept. 25, 1974

[21] Appl. No.: 509,320

[30] Foreign Application Priority Data

| Sept. 29, 1973 | Japan | 48-113686[U] |
| Sept. 29, 1973 | Japan | 48-113687[U] |
| Sept. 29, 1973 | Japan | 48-113690[U] |
| Apr. 17, 1974 | Japan | 49-43359[U] |
| Apr. 17, 1974 | Japan | 49-43361[U] |
| July 19, 1974 | Japan | 49-86703[U] |

[52] U.S. Cl. .................... 354/29; 354/28; 354/45; 354/52; 354/231
[51] Int. Cl.² .................... G03B 7/14
[58] Field of Search .......... 354/26, 27, 28, 29, 354/45, 231, 52

[56] References Cited
UNITED STATES PATENTS 3,203,330   8/1965   Kiper .................... 354/231
3,213,772  10/1965   Starp .................... 354/28

Primary Examiner—Russell E. Adams, Jr.
Attorney, Agent, or Firm—Ostrolenk, Faber, Gerb & Soffen

[57] ABSTRACT

An electric eye exposure apparatus includes an exposure meter interlocked with drive means and a switching mechanism for selectively connecting the drive means either to a shutter blade operating mechanism or to a diaphragm aperture control mechanism. The drive means further cooperates with a shutter speed governor. The exposure apparatus permits control of both the diaphragm aperture and shutter speed to be selected between at least two of a variety of optional exposure procedures including electric eye exposures of a programmed type, an electric-eye followed shutter speed type, an electric-eye followed diaphragm opening type, as well as an exposure of a manually-selected shutter speed and diaphragm opening type.

9 Claims, 26 Drawing Figures

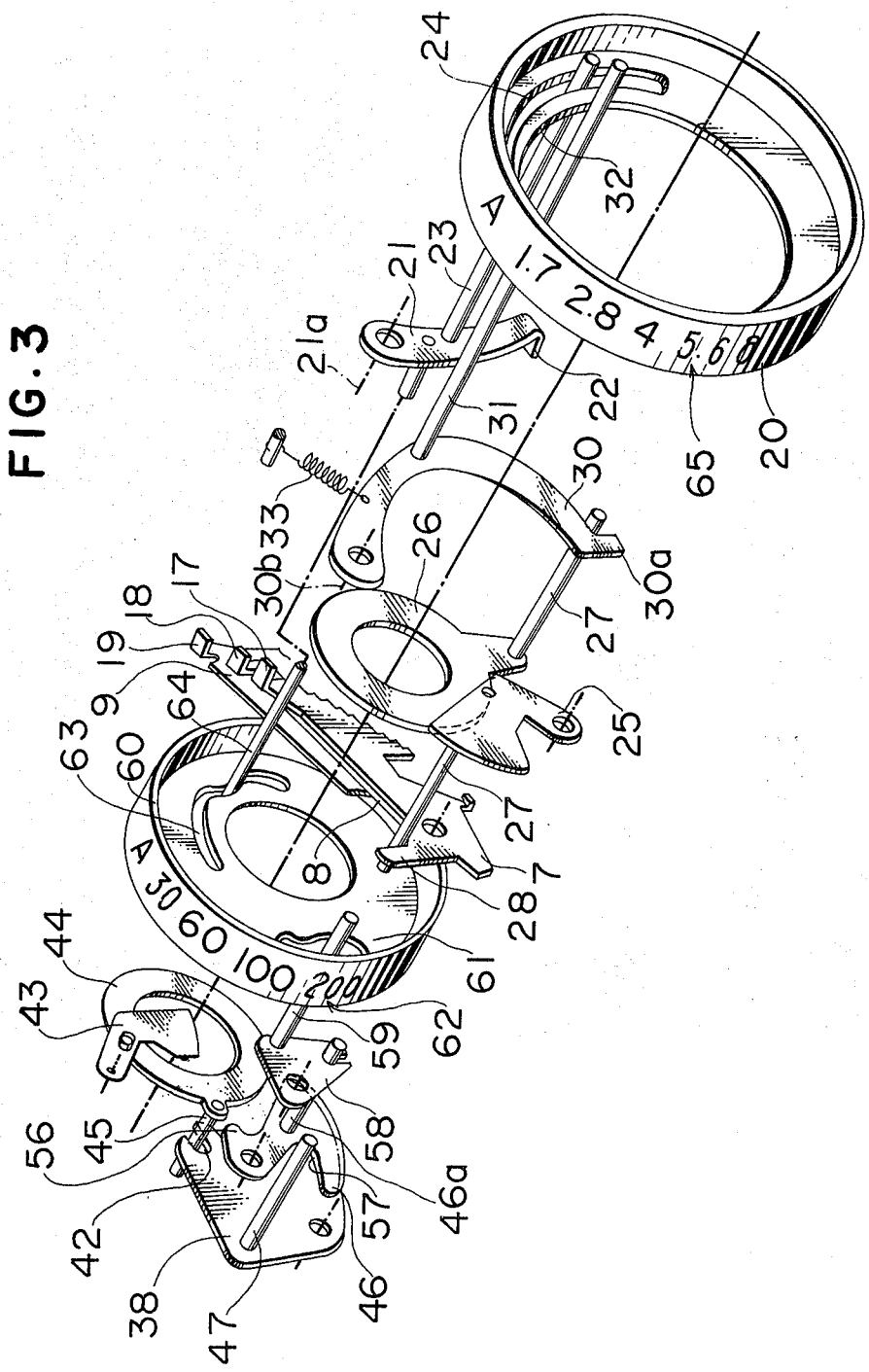

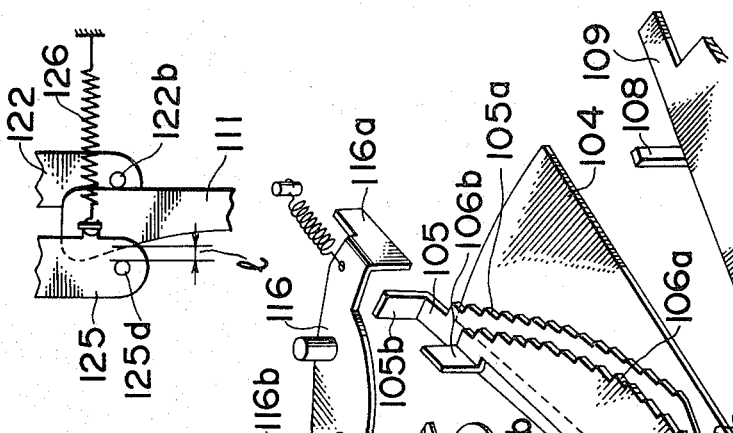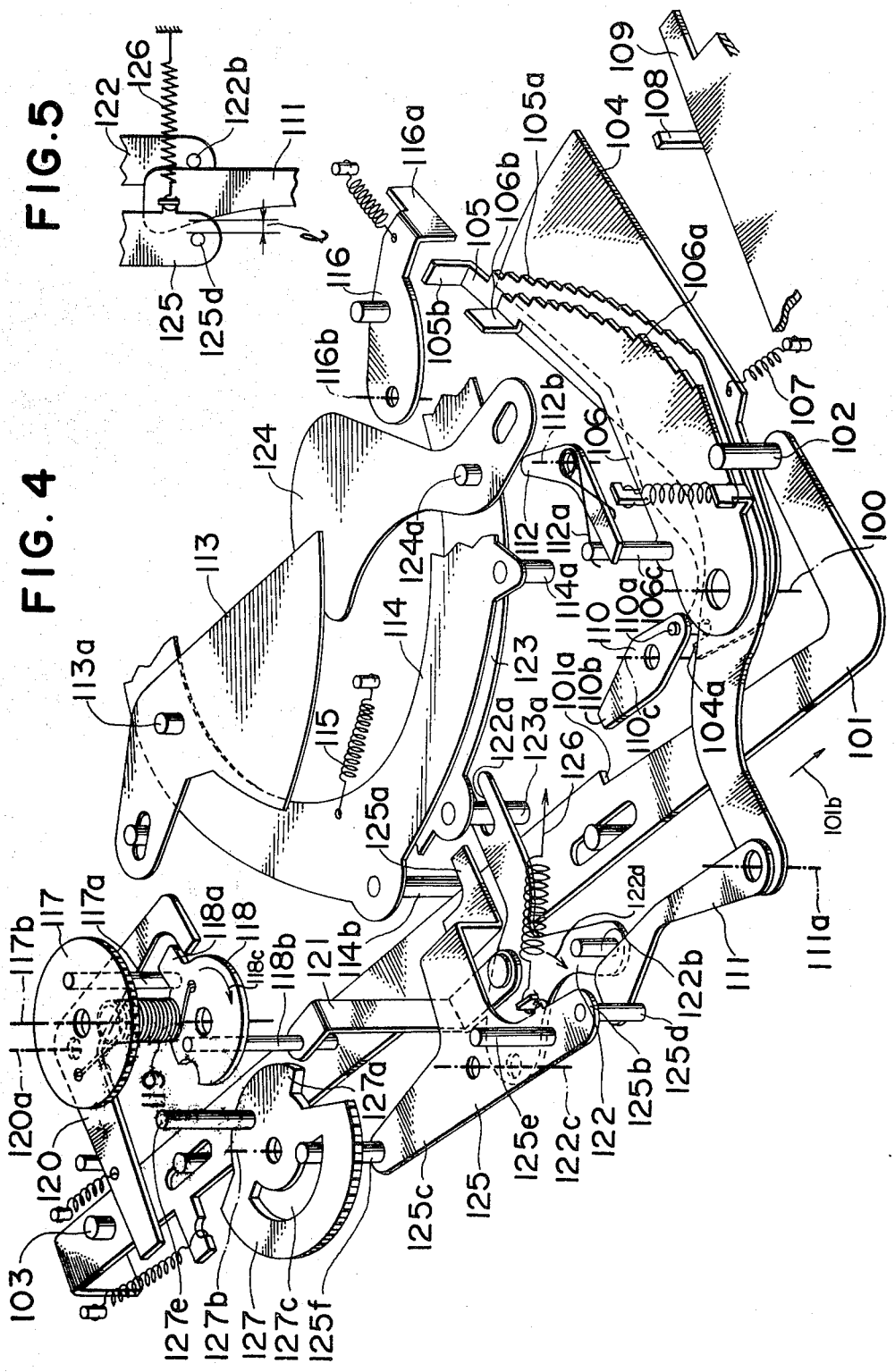

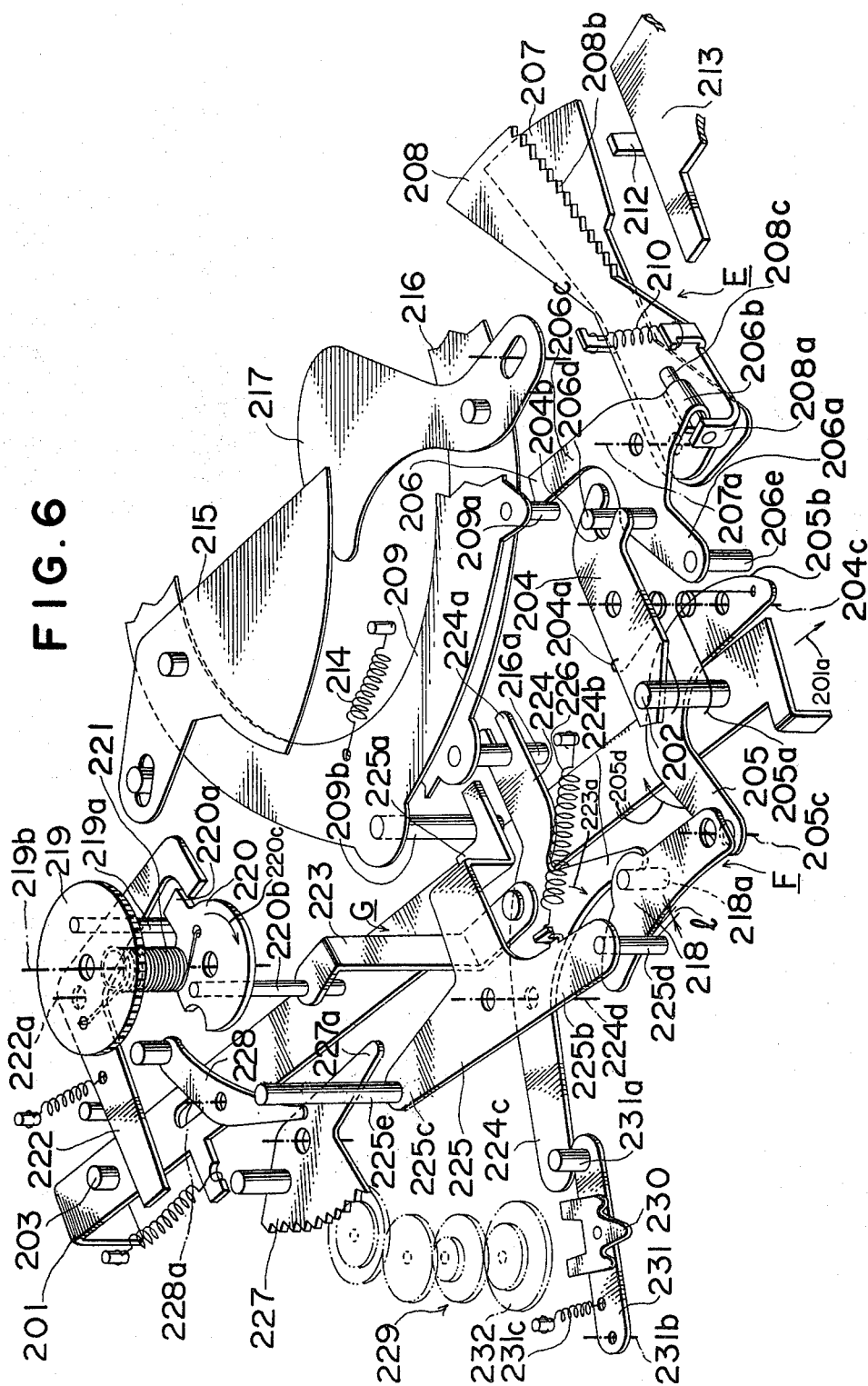

ELECTRIC EYE EXPOSURE APPARATUS FOR USE IN A CAMERA HAVING A BLADED SHUTTER MECHANISM

BACKGROUND OF THE INVENTION

The invention relates to an EE (electric-eye) exposure apparatus for use in a bladed shutter camera.

Conventional EE cameras are constructed such that an EE mechanism is given a selected parameter for establishing an amount of exposure so as to permit a selected photographic operation according to the programmed EE (i.e. fully automatic operation), an EE followed shutter speed (i.e. an EE operation in which the shutter speed is initially preset), an EE followed diaphragm opening (i.e. an EE operation in which the diaphragm aperture is initially preset) scheme and the like. As a result, a photographer has to choose a suitable camera depending on the intended photographic operation. Considering a programmed shutter, for example, combinations of diaphragm apertures and effective exposure periods are predetermined for selected values of exposure. This removes the need for any scale adjustment prior to a photographic operation, and a proper amount of exposure is assured merely by depressing a shutter button. However, inconvenience is caused in that a photographer can not choose a desired combination of a particular diaphragm aperture and an effective exposure period. Consequently, a programmed shutter is inadequate for use with certain photographic techniques such as choosing a shutter speed below a limit above which oscillations may be caused or choosing a depth of focus in accordance with a desired diaphragm aperture by viewing the deflection of a meter pointer within a view finder.

While it may be desired that a single camera be usable in two photographic operations such as those of a programmed type and an electric-eye followed shutter speed type, this involves certain difficulties as will be discussed below. Specifically, the time interval during which shutter blades are maintained open is controlled by a delay mechanism which engages an anchor with an escape wheel. In a programmed type operation, the opening must vary with time according to a triangular form as is well known, and this requires the delay mechanism to be engaged with a shutter mechanism including a shutter operating ring or the like, before a shutter release is operated. As a consequence, when switching from a programmed type operation to a shutter speed preset operation, the shutter operating ring or the like must be adjusted with the governor in engagement, which results in a slow switching operation. If an immediate release operation is attempted, the release operation may take place before the switching operation is completed. On the other hand, if the arrangement is adapted for a preset shutter speed operation, the shutter will rapidly move in the opening direction and the delay mechanism will engage the shutter mechanism only when the latter is fully open, therefore precluding a triangular opening profile, which is desired in a programmed operation, from being achieved.

SUMMARY OF THE INVENTION

In view of the foregoing, it is an object of the invention to provide an EE exposure apparatus for use in a bladed shutter camera which permits at least two of the various exposure procedures to be effected, including EE exposures such as a programmed type, an electric-eye followed shutter speed type, and an electric-eye followed diaphragm opening type as well as manual exposure.

In accordance with the invention, drive means, which is interlocked with an exposure meter and selectively cooperates with a governor, is combined in a sophisticated manner with a switching mechanism which selectively connects the drive means with either a shutter blade operating mechanism or a diaphragm aperture control mechanism, in conjunction with the governor so as to permit at least two of the exposure procedures to be effected, including EE exposures such as a programmed type, an electric-eye followed shutter speed type, and an electric-eye followed diaphragm opening type as well as manual exposure. In addition, various difficulties which accompany the object of enabling a plurality of exposure procedures are overcome in a favorable manner.

BRIEF DESCRIPTION OF THE DRAWINGS

FIG. 3 is a perspective view of the apparatus shown in FIG. 1;

FIG. 4 is a schematic perspective view of the EE exposure apparatus according to another embodiment of the invention;

FIG. 5 is a fragmentary front view showing the relationship between a control lever, a shutter drive lever and a diaphragm lever;

FIG. 6 is a schematic perspective view of the EE exposure apparatus according to a further embodiment of the invention;

DETAILED DESCRIPTION OF THE PREFERRED EMBODIMENTS

Figure 1:
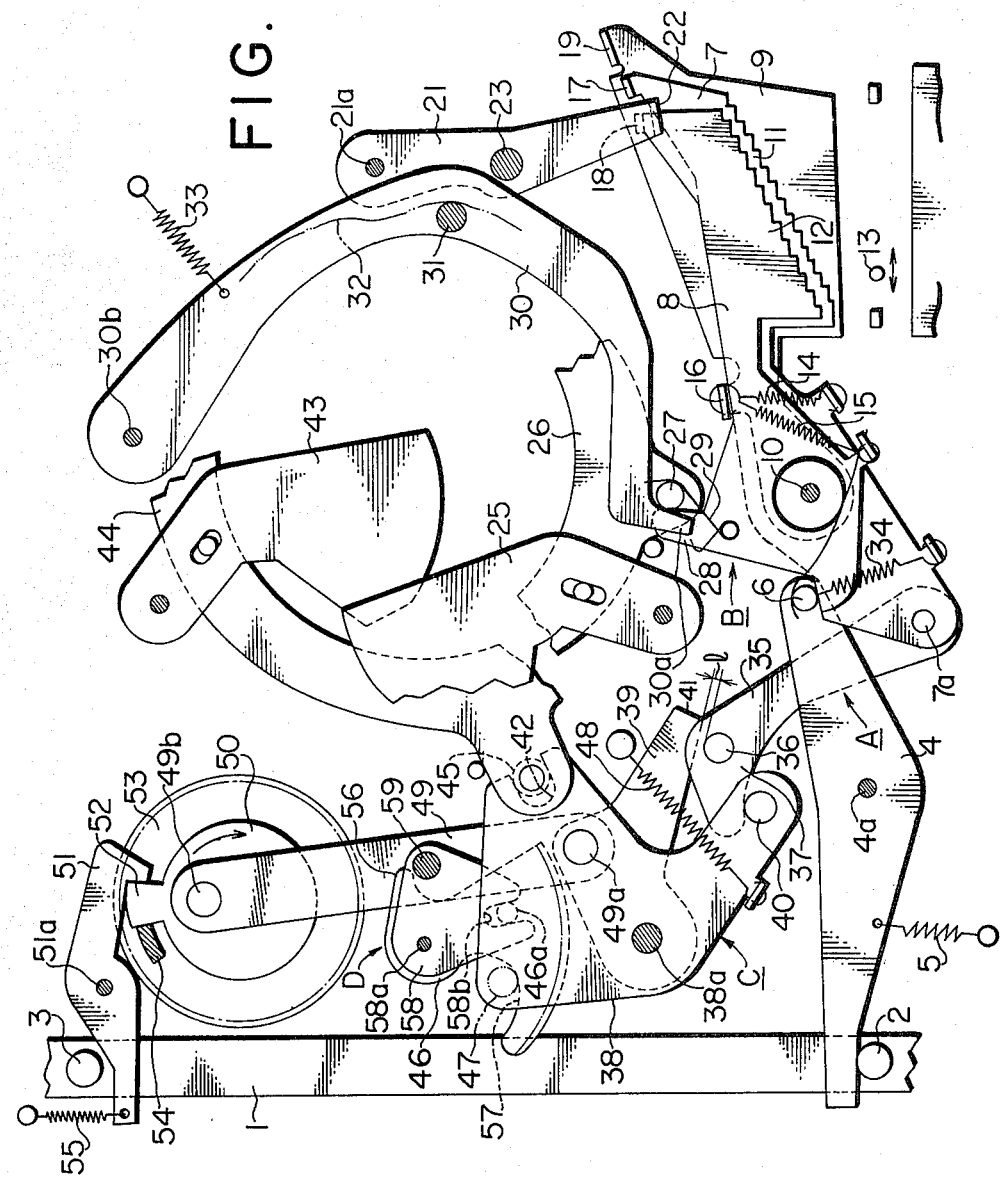
FIG. 1 is a schematic front view of the EE exposure apparatus according to one embodiment of the invention.

Referring to FIG. 1, there is shown the apparatus according to the invention which permits an EE exposure of shutter speed preset type and a manual exposure in addition to a programmed EE exposure operation. Referring to FIG. 1, a release rod 1 is adapted to be moved downward as a shutter button, not shown, is depressed. Rod 1 has a pair of pins 2 and 3 fixedly mounted thereon. Bearing against the lower pin 2 is one end of a setting lever 4 pivotally mounted at 4a, which lever is normally biased to rotate counter-clockwise by a spring 5. Consequently, when the release rod 1 moves downward, the setting lever 4 follows it, rotating counter-clockwise. The other end of the setting lever 4 has a pin 6 fixedly mounted thereon, which engages with a pointer bearing plate 7 of a first exposure meter interlocked mechanism A (hereinafter referred to as a first pointer bearing plate) for a programmed operation and with a pointer bearing plate 8 of a second exposure meter interlocked mechanism B for a reset shutter speed operation (hereinafter referred to as a second pointer bearing plate), respectively. Both of the pointer bearing plates 7 and 8 are pivotally mounted on a stationary axle 10 together with a clamp plate 9. The pointer bearing plates 7, 8 are provided, on the same lateral side of their one end, with stepped saw-teeth 11, 12 which are located opposite to a pointer 13 of an exposure meter. The plates 7, 8 can be selectively rotated clockwise to have their saw-teeth 11, 12 bear against the pointer 13. The clamp plate 9 serves to prevent movement of the pointer 13 by engaging it before the saw-teeth 11, 12 bear against the pointer 13. The plates 7, 8 are connected with the clamp plate 9 by means of springs 14, 15, respectively, so as to be pulled toward each other. The clamp plate 9 is provided with a tab 16 against which the upper edges of the plates 7, 8 bear, and normally these plates are in an aligned position as shown in FIG. 1. Each of the ends of the plates 7, 8 and 9 located near the saw-teeth 11, 12 are further provided with an engaging piece 17, 18 and 19, respectively, above which is located a pawl 22 of a switching lever 21 which is operated by a diaphragm ring 20 (see FIG. 3). By changing the position of the pawl 22, the clockwise rotation of the plates 7, 8 and 9 can be selectively controlled. As shown in FIGS. 1 and 3, the switching lever 21 is pivotally mounted at 21a and has a connection rod 23 which is fitted into a switching cam slot 24 formed in the diaphragm ring 20. When the diaphragm ring 20 is rotated, the cam slot 24 moves the connection rod 23, thereby operating the switching lever 21. Referring to FIG. 1, the second pointer bearing plate 8 is provided with a pawl 28 which bears against a pin 27 extending from a base plate 26 for a plurality of diaphragm blades 25 (only one being shown), and is normally maintained in engagement therewith by a coiled torsion spring 29. As the second pointer bearing plate 8 rotates, the base plate 26 also rotates to change the aperture formed by the diaphragm blades 25. These elements constitute together the second exposure meter interlocked mechanism B.

The pin 27 on the base plate 26 is also engaged by a free end 30a of a manual diaphragm lever 30 which is pivotally mounted at 30b. The lever 30 has a connection rod 31 which bears against a manual diaphragm cam 32 formed on the diaphragm ring 20, so that when the diaphragm ring 20 is operated, the manual diaphragm lever 30 is rotated accordingly to cause a rotation of the diaphragm blades 25, thus allowing a selected aperture to be established by the diaphragm blades 25. It will be noted that the manual diaphragm lever 30 is urged by a spring 33 to maintain the connection rod 31 in bearing engagement with the manual diaphragm cam 32 on the diaphragm ring 20 so as to bring the base plate 26 to an angular position corresponding to the cam profile.

In the standby position of the plates 7, 8, they are engaged by the pin 6 on the setting lever 4 as a result of the resilience of a connecting spring 34 extending between the setting lever 4 and the first pointer bearing plate 7. The springs 14, 15 and 34 cause the plates 7, 8 and 9 to follow a movement of the setting lever 4 in an integral manner except where their movement is blocked by other members.

The first pointer bearing plate 7 carries a pivot 7a on which is pivotally mounted a control lever 35 which is adapted to move upward as the plate 7 rotates clockwise, and which together with other members to be described later, constitute the first exposure meter interlocked mechanism A for controlling the aperture which is defined by a plurality of shutter blades 43 (only one being shown) of a shutter blade operating mechanism C. The control lever 35 carries a pin 36 at its upper end, which upper end is curved to the left to form a relieved portion 37. The control lever 35 is adapted to control the mechanism C which drives the shutter blades 43 as will be described later. The mechanism C includes a drive lever 38 and an idle lever 39 which are pivotally mounted on a same pivot 38a. The drive lever 38 is provided with a pin 40 which is located opposite the relieved portion 37 of the control lever 35, while the idle lever 39 is provided with a projection 41 which is located opposite to the pin 36 on the control lever 35. In this manner, the upper end of the control lever 35 is interposed intermediate the pin 40 on the drive lever 38 and the projection 41 of the idle lever 39. The projection 41 of the idle lever 39 is spaced from the control lever 35 by a distance $l$, which varies with the vertical level assumed by the control lever 35 in a manner such that upon shutter release, as the control lever 35 is raised upward by the pointer bearing plate 7, an increasing length of the relieved portion 37 slides past the pin 40 to increase the distance $l$. The arrangement can be freely chosen depending on the configuration of the relieved portion 37, which performs an important role as a key in establishing a program. The distance $l$ increases with an increase in the amount by which the first pointer bearing plate 7 rotates clockwise. Thus, as the meter pointer 13 moves to the right in FIG. 1, indicating an increased brightness, the first pointer bearing plate 7 rotates clockwise by an increased amount, thus increasing the distance *l*.

The drive lever 38 is formed with a bifurcated channel 42 which engages a pin 45 provided on a base plate 44 for shutter blades 43. As the drive lever 38 rotates back and forth, the base plate 44 also rotates in a reciprocating manner, thus opening or closing the shutter blades 43. The drive lever 38 is also provided with a pin 47 which is located opposite a primary gear 46 of the governor to be described later. A spring 48 urges the drive lever 38 to rotate counter-clockwise, but its strength is not sufficient to cause a rotation of the drive lever 38 together with the base plate 44 for the shutter blades 43. Thus, it remains in position unless an external force is applied thereto.

The idle lever 39 is pivotally connected at 49a with a link 49 which is in turn pivotally connected with a drive wheel 50 at 49b. The pivot 49b is located at an eccentric position with respect to the center of the drive wheel, and as a result, the idle lever 39 undergoes a reciprocating rotation as the drive wheel 50 rotates. In the standby position, the pivot 49b assumes its upper position shown in FIG. 1, and the idle lever 39 initially moves down while rotating clockwise until a lowermost position is reached, whereupon it rotates counter-clockwise to move upward to its initial position, thereby rotating the drive lever 38 through the control lever 35 and opening or closing the shutter blades 43. In this manner, these components constitute together the shutter blade operating mechanism C. Additionally, the drive wheel 50 is provided with an engaging member 52 which is locked by a release lever 51 pivotally mounted at 51a. The drive wheel 50 is connected with a charging gear 53 which is interlocked with a winding mechanism. While it is urged to rotate clockwise, the rotation of the drive wheel 50 is prevented by the engaging member 52 being locked by the release lever 51 in the standby position shown in FIG. 1. In a charging operation, the charging gear 53 rotates clockwise together with a stop 54 extending therefrom, charging a power spring (not shown) in order to impart a rotative force to the drive wheel 50. At this time, the stop 54 initiates its rotation from a position forwardly of the engaging member 52, and thus it can be rotated independently from the engaging member 52 until it bears against the trailing end of the engaging member 52 which is then locked by the release lever 51, thus energizing the drive wheel 50. This is the condition illustrated in FIG. 1. The other end of the release lever 51 extends below the pin 3 provided on the release rod 1 with a clearance therebetween so that the depression of the release rod 1 does not immediately result in an abutment of pin 3 against the release lever 51. More specifically, the setting lever 4 rotates concurrently with the depression, but the release lever 51 rotates counter-clockwise to thereby release the drive wheel 50 only after a definite time interval. A spring 55 is provided for normally urging the release lever 51 to rotate clockwise.

Figure 2:
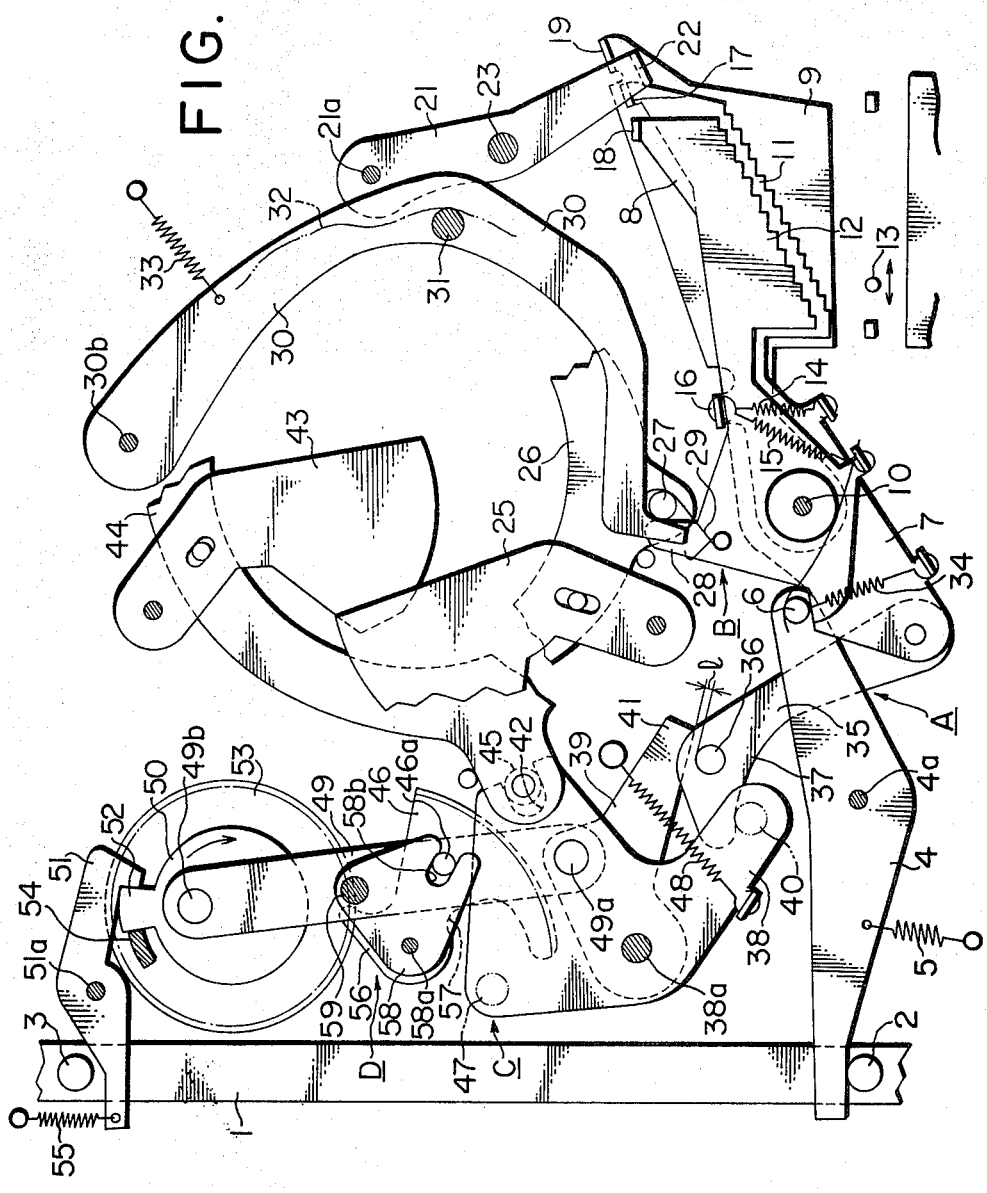
FIG. 2 is a schematic front view illustrating the operation of the apparatus shown in FIG. 1.

The primary gear 46 of the governor is pivotally mounted at a position intermediate the drive wheel 50 and the drive lever 38, and is formed with a toothed sector wheel which is interconnected with a braking mechanism such as an escapement through a group of gears, not shown, thereby forming a governor assembly D for controlling the speed with which the shutter blades are opened or closed by the mechanism C. As a consequence, a high torque is needed to rotate the primary gear 46. In addition, the primary gear 46 is provided with a projection 56 which extends into the path of travel of the engaging member 52 of the drive wheel 50, and is also provided with an abutment 57 located opposite the pin 47 on the drive lever 38, and a pin 46a. As indicated in FIG. 2, when the projection 56 extends into the path of travel of the engaging member 52, the abutment 57 is removed from the pin 47 on the drive lever 38, thereby precluding its engagement with this pin even when the drive lever 38 is operated. When the pin 47 on the drive lever 38 is located against the abutment 57 of the primary gear 46, as indicated in FIG. 1, the projection 56 is retracted from the path of travel of the engaging member 52 (see FIG. 1). The primary gear 46 of the governor assembly is preset in either of these conditions by a switching lever 58 which is pivotally mounted at 58a and has a bifurcated channel 58b into which the pin 46a is fitted. When a programmed exposure operation is intended, it is preset in the position shown in FIG. 1, while it is preset in the position shown in FIG. 2 when a preset shutter speed or manual exposure operation is intended. As shown in FIG. 3, the switching lever 58 is connected through a connection rod 59 with a shutter speed changing cam 61 on a shutter speed ring 60. Thus, when the shutter speed ring 60 is adjusted to a given speed scale 62, the camera is conditioned for a preset shutter speed and/or manual exposure operation, while it can be used in a programmed exposure operation by adjusting the shutter speed ring 60 to an auto-scale A.

When the apparatus described is to be used as a programmed shutter, the shutter speed ring 60 is rotated to bring its auto-scale A into coincidence with a pointer, not shown. The connection rod 59 is moved by the shutter speed changing cam 61 to cause a rotational displacement of the switching lever 58, which causes the primary gear 46 to rotate to the position shown in FIG. 1. Specifically, the projection 56 of the primary gear 46 is retracted from the path of travel of the engaging member 52 of the drive wheel 50, while the abutment 57 on the primary gear 46 bears against the pin 47 on the drive lever 38. On the other hand, the diaphragm ring 20 is also manually rotated to bring its auto-scale A into coincidence with a pointer, not shown, to fix a diaphragm aperture. The connection rod 23 which extends through the switching cam slot 24 of the diaphragm ring 20 is displaced, causing a rotational displacement of the switching lever 21 to the position shown in FIG. 1. Thus, the pawl 22 of the switching lever 21 is located opposite to only the engaging piece 18 of the pointer bearing plate 8 which is destined for use with a preset shutter speed operation, preventing its rotation. Thus, only the first exposure meter interlocked mechanism A is operable, and the pointer bearing plate 7 associated with a programmed exposure operation as well as the clamp plate 9 are not blocked by the switching lever 21.

When the camera is directed toward an object being photographed, the meter pointer 13 will be displaced depending upon its brightness reading in readiness for the descent of the plate 7. When a shutter button, not shown, is depressed, the release rod 1 is moved downward, whereby the pin 2 is immediately retracted from the setting lever 4 thereby allowing it to rotate counter-clockwise by under the influence of spring 5. The first pointer bearing plate 7 and the clamp plate 9 which had been rotated counter-clockwise by the pin 6 on the setting lever 4 are now pulled by the interconnecting spring 34 to rotate clockwise integrally, as the setting lever 4 rotates, the clamp plate 9 initially engaging the meter pointer 13 to preclude its movement, followed by a further clockwise rotation of the first pointer bearing plate 7, resulting in its abutment against the meter pointer 13, whereupon it comes to a stop. Thus the stroke through which the plate 7 rotates depends on the position of the meter pointer 13, the stroke increasing with a brighter indication given by the meter pointer 13. The second pointer bearing plate 8 remains stationary during the time the setting lever 4 rotates counter-clockwise, since its rotation is prevented by the switching lever 21. The clockwise rotation of the first pointer bearing plate 7 causes the control lever 35 to move upward, and hence increase the distance $l$ between the projection 41 of the idle lever 39 and the pin 36. In other words, the greater the brightness of an object being photographed, the greater the distance $l$. Subsequent to the rotation of the setting lever 4, the pin 3 on the release rod 1 drives the release lever 51 into counter-clockwise rotation, thus releasing its engagement with the engaging member 52 on the drive wheel 50, which therefore rotates clockwise. Thereupon the idle lever 39 is rotated clockwise through the link 49, moving its projection 41 downward. After travelling downward through the distance $l$, the projection 41 strikes the pin 36 on the control lever 35, thus causing it to rotate. Since the relieved portion 37 of the control lever 35 is previously in abutment against the pin 40 on the drive lever 38, its rotative force is transmitted to the latter. Thus the drive lever 38 rotates clockwise and with a low speed since the pin 47 thereon bears against the abutment 57 of the primary gear 46 of the governor assembly D to permit its own rotation only with concurrent driving of the primary gear 46. When the link 49 reaches its lowermost position and turns to move upward, the idle lever 39 now rotates counter-clockwise, retracting from the control lever 35, so that its rotative force is no longer transmitted to the drive lever 38, which therefore rotates counter-clockwise under the influence of spring 48 to its original position. Stated differently, the drive lever 38 of the mechanism C for opening or closing the shutter blades 43 initially rotates clockwise with a low speed, and then rotates counter-clockwise with a high speed, thereby completing a reciprocatory motion. The direction of rotation is changed when the link 49 has reached its extreme lower position. Since the amount by which the idle lever 39 rotates until the extreme lower position is reached is constant, the amount of rotation of the drive lever 38 varies with the vertical level assumed by the control lever 35 of the first exposure meter interlocked mechanism A. In other words, such amount of rotation is determined in inverse proportion to the distance $l$ which in turn varies with the vertical level of the control lever 35. Since the distance $l$ is determined by the position of the meter pointer 13, the aperture defined by the shutter blades 43 and the time interval during which such aperture is maintained are controlled in a programmed manner in dependance upon the brightness of an object being photographed.

In a manual exposure operation, the diaphragm ring 20 is manually rotated to bring a desired diaphragm value on the scale 65 into coincidence with a pointer associated therewith. The connection rod 23 associated with the switching lever 21 is moved by the switching cam slot 24 to cause a rotational displacement of the switching lever 21, whereby the pawl 22 is moved to a position below the engaging pieces 17, 19 of the first pointer bearing plate 7 and the clamp plate 9, preventing a rotation of these plates. As the diaphragm ring 20 is angularly operated, the manual diaphragm cam 32 moves the connection rod 31 to cause the diaphragm lever 30 to rotate against the force of the spring 33. The diaphragm lever 30 then moves the pin 27 on the base plate 26, which is therefore rotated to cause an opening of the diaphragm blades 25 to a degree dependent upon the amount of such rotation. Thus, a diaphragm aperture is established by the setting which a photographer has chosen.

Then the shutter speed ring 60 is manually rotated to bring a desired shutter speed value on the scale 62 into coincidence with a pointer associated therewith. The shutter speed changing cam 61 causes the connection rod 59 to be moved, which results in a rotation of the switching lever 58 to rotate the primary gear 46 of the governor assembly D. As a result, the primary gear 46 of the governor assembly assumes the position shown in FIG. 2 in which the abutment 57 is removed from the pin 47 on the drive lever 38, preventing an engagement therebetween when the drive lever 38 rotates. The projection 56 on the primary gear 46 moves into the path of travel of the engaging member 52 on the drive wheel 50, and the position which the projection 56 assumes within the path of travel of the engaging member 52 depends upon an established shutter speed value. Specifically, the slower the shutter speed, the greater the stroke through which it will be rotated by the engaging member 52. Stated differently, if the projection 56 extends to a further extent, the longer the time interval during which it engages the engaging member 52, and since this is the time interval during which the shutter blades 43 remain open, the shutter speed is accordingly slower. It is to be noted that the projection 56 extends into a position within the path of travel of the engaging member 52 after the shutter blades 43 have been fully opened.

Subsequently, when the camera is directed toward an object being photographed and a shutter button, not shown, is depressed to move the release rod 1 downward, the pin 2 immediately permits the setting lever 4 to rotate, but the first pointer bearing plate 7 and the clamp plate 9 are prevented from rotation by the switching lever 21 in the manner mentioned previously, and the second pointer bearing plate 8 is also prevented thereby from rotation, so that the control lever 35 does not move upward. On the other hand, the pin 3 on the release rod 1 operates upon the release lever 51, releasing the drive wheel 50, which therefore initiates its rotation. Because the first exposure meter interlocked mechanism A remains inoperable and the control lever 35 does not move upward, the idle lever 39 immediately bears against the pin 36 on the control lever 35, thereby rotating it. As a consequence, the control lever 35 is urged against the pin 40 on the drive lever 38 to rotate the latter, whereby the shutter blades 43 are opened. This operation takes place at a high speed since the primary gear 46 of the governor assembly D does not participate in such motion. However, when the shutter blades 43 become fully open, the bearing member 52 on the drive wheel 50 bears against the projection 56 of the primary gear 46 which then extends into the path of travel thereof, thereby retarding the rotation of the drive lever 38 from that time on. As the primary gear 46 further rotates to retract its projection 56 from the path of travel of the engaging member 52, the drag presented is rapidly reduced, whereby the drive wheel 50 rotates with a high speed again, closing the shutter blades 43. By controlling the extent by which the projection 56 of the primary gear 46 of the governor assembly D extends into the path of travel of the engaging member 52, the time interval during which the shutter blades 43 remain fully open can be varied and the shutter speed adjusted. Since the diaphragm blades 25 are previously adjusted to a given aperture, an intended amount of exposure is assured.

When using the shutter in an exposure operation of a preset shutter speed type, the shutter speed ring 60 is manually rotated to bring a desired shutter speed value on the scale 62 into coincidence with a pointer associated therewith in the similar manner as mentioned previously. This results in a rotation of the primary gear 46 of the governor assembly D, extending the projection 56 thereof into the path of travel of the engaging member 52 on the drive wheel 50, thereby establishing a shutter speed. At this time, the switching lever 21 is rotated to move its pawl 22 to a position below the engaging piece 17 on the first pointer bearing plate 7 to prevent the rotation of only the plate 7, as by directly operating on the switching lever 21 through a connection rod 64 and a switching groove 63 (see FIG. 3) in the shutter speed ring 60, or by operating the switching lever 21 with the diaphragm ring 20. The meter pointer 13 has its home position changed depending on a shutter speed value established. This may be accomplished by either mechanical or electrical means, as by rotating the body of the meter, for example.

Subsequently when the camera is directed toward an object being photographed and a shutter button, not shown, is depressed to move the release rod 1 downward, the setting lever 4 is rotated counter-clockwise by the release of pin 2, whereby the pointer bearing plate 8 of the second exposure meter interlocked mechanism B and the clamp plate 9 rotate clockwise through an angle which depends upon the position of the meter pointer 13. The pawl 28 of the plate 8 rotates the base plate 26 of the diaphragm blades 25, thereby opening these blades 25. The aperture defined by the diaphragm blades is proportional to the amount of rotation through which the base plate 26 is rotated, which is in turn proportional to the amount of rotation of the pointer bearing plate 8. The amount of rotation of the plate 8 is determined by the position of the meter pointer 13, which in turn has its home position adjusted in accordance with a shutter speed, and hence a proper amount of exposure is achieved. The shutter blades 43 are driven in the similar manner as in a manual operation, and are opened and closed in accordance with an established shutter speed. This operation is similar to the one described previously, and will not be repeated.

FIG. 4 shows an apparatus according to the invention which permits a programmed shutter to be used in either manual or a preset shutter speed exposure operation, by a simple procedure of mating the governor mechanism either with a diaphragm operating mechanism or a shutter drive mechanism through the choice provided on a shutter ring and selectively locking either one or both of a diaphragm presetting mechanism and a shutter speed presetting mechanism by operation of a switching mechanism which selects a photographic operation. Referring to FIG. 4, a shutter release lever 101, which is moved downward in the direction of arrow 101b upon depression of a shutter button, carries pins 102 and 103 on its lower and upper ends, respectively. Bearing against the lower pin 102 is each one end of a clamp plate 104, a pointer bearing plate 105 for a programmed shutter operation (hereinafter referred to as a first pointer bearing plate) and another pointer bearing plate 106 for a preset shutter speed operation (hereinafter referred to as a second pointer bearing plate), all of which are rotatably mounted on a common pivot 100 in overlapping relationship. The pointer bearing plates 105 and 106 are resiliently coupled with the clamp plate 104, which is biased for rotation in one direction by a spring 107 and which, upon downward movement of the shutter release rod 101, rotates in the direction of the biasing force of spring 107 together with the pointer bearing plates 105 and 106 to move against a meter pointer 108, thereby urging it against a pointer abutment 109. The meter pointer 108 is adapted to be displaced in accordance with the brightness of an object being photographed. The pointer bearing plates 105 and 106 are formed with saw-toothed cam surfaces 105a and 106a along their lateral edges facing the meter pointer 108, which cam surfaces are adapted to bear against the meter pointer 108 subsequent to the engagement of clamp plate 104 therewith, thereby varying the amount of rotation imparted to the respective plates in accordance with the position at which they bear against the pointer 108. The clamp plate 104 is formed with a bifurcated channel 104a which is engaged by a pin 110a fixedly mounted on one end of a lock lever 110 which is pivotally mounted at 110c and has its other end formed as a detent piece 110b. The detent piece 110b is arranged to rotate into engagement with a step 101a formed on one lateral edge of the shutter release lever 101 when the clamp plate 104 rotate without being constrained by the meter pointer 108. The pointer bearing plate 105 is formed with a folded piece 105b at the end adjacent to the cam surface 105a, while its other end is pivotally connected at 111a with the lower end of a control lever 111. The control lever 111 has an increased width at its upper end, tapering toward its lower end, and is adapted to be moved upward when the stepped cam surface 105a of the first pointer bearing plate 105 rotates toward the meter pointer 108, the control lever 111 forming a shutter speed presetting mechanism together with the pointer bearing plate 105. The second pointer bearing plate 106 is formed with a folded piece 106b at its free end adjacent to the cam surface 106a, and a pin 106c is fixedly mounted intermediate the folded piece 106b and the pivot 100 and engages with one end of a diaphragm presetting lever 112. The lever 112 defines a diaphragm presetting mechanism together with the second pointer bearing plate 106, and is centrally pivoted at 112b and is integrally coupled with the pin 106c by means of a spring 112a. The other end of the second pointer bearing plate 106 controls an aperture defined by diaphragm blades 113 in accordance with the amount of rotation thereof limited by the engagement between its cam surface 106a and the meter pointer 108. A diaphragm aperture is defined by a plurality of diaphragm blades 113 (only one being shown) which are pivotally mounted on an annular base plate 114 at equal intervals, the aperture being controlled by the amount of rotation of the base plate 114. The base plate 114 is urged to rotate in the direction of the diaphragm presetting lever 112 by a spring 115, and its rotation is controlled by the abutment of a pin 114a fixedly mounted thereon with the other end of the lever 112. The base plate 114 also has a pin 114b fixedly mounted thereon. A switching mechanism which selects a photographic operation comprises a switching lever 116 pivotally mounted at 116b and having its one end folded to form a retaining piece 116a which selectively locks the first and second pointer bearing plates 105 and 106 against rotation.

There is provided a set gear 117 which is interlocked with a film winding mechanism, and pivotally mounted on the common axis 117b thereof is a drive wheel 118 having a projection 118a extending from a portion of its peripheral surface and also having a drive pin 118b fixedly mounted thereon adjacent to its outer periphery. A coiled spring 119 extends between the drive wheel 118 and the set gear 117 and is charged by rotating the set gear 117 for the purpose of storing rotative power for the drive wheel 118. A stop pin 117a is fixedly mounted on the underside of the set gear 117 and engages the projection 118a on the drive wheel 118. The drive wheel 118 has its projection 118a engaged with one end of a release lever 120, whereby its rotation is prevented. The release lever 120 is pivotally mounted at 120a and has its other end extending above the shutter release lever 101 and into the path of movement of the pin 103. Subsequent to the abutment of either pointer bearing plate 105 or 106 against the meter pointer 108 in response to the downward movement of the shutter release lever 101, the release lever 120 is urged to rotate by the pin 103, whereby the drive wheel 118 is freed for rotation. The drive pin 118b has its free end pivotally connected with one end of a link 121, the other end of which is pivotally mounted on a shutter drive lever 122. The shutter drive lever 122 is V-shaped in configuration and is rotatably mounted on a pivot 122c at the valley of the V-shape. One of the limbs of the lver 122 is bifurcated to form a retainer 122a, while the other limb carries an operating pin 122b at its free end. The shutter drive lever 122 constitutes a shutter drive mechanism together with the drive wheel 118 and the link 121. The retainer 122a of the shutter drive lever 122 is engaged by a pin 123a fixedly mounted on an annular base plate 123 for shutter blades, and as the pin is moved in an angular direction, a plurality of shutter blades 124 (only one being shown) pivotally mounted at pivots 124a on the base plate 123 at equal intervals opened or closed. The base plate 123 is concentric with the base plate 114 for the diaphragm blades, and is disposed in overlying relationship therewith. On the pivot of the shutter drive lever 122 is also pivotally mounted a diaphragm lever 125 which comprises a diaphragm drive mechanism. The lever 125 has three radially extending arms 125a, 125b and 125c. The first arm 125a is engaged with the pin 114b on the base plate 114 for the diaphragm blades, while the second arm 125b has an operating pin 125d and a connecting pin 125e fixedly mounted on its lower and upper surfaces, respectively, and the third arm 125c has a pin 125f fixedly mounted thereon. The operating pin 125d is located opposite the operating pin 125b on the shutter drive lever 122, with the control lever 111 interposed between both operating pins 125d and 122b, while the connecting pin 125e bears against a cam surface of an auto-manual switching cam which is interlocked with a diaphragm ring, not shown. The diaphragm lever 125 is urged by a spring 126 to hold the first arm 125a resiliently in a position where the base plate 114 is located so as to fully open the diaphragm blades 113 against the force of spring 115. A primary gear 127 which forms part of a governor assembly is rotatably mounted on a pivot 127b at its center, and is provided with a projection 127a. Additionally, the primary gear is formed with an arcuate slot 127c into which the pin 125f of the diaphragm lever 125 extends. The primary gear 127 also carries a pin 127e which is adapted to cooperate with a shutter ring. The primary gear 127 can be selectively interlocked with the diaphragm lever 125 by causing the pin 125f to be engaged with the edge of the slot 127c, or interlocked with the drive wheel 118 by placing the projection 127a in the path of rotation of the projection 118a of the drive wheel 118.

In operation, when the arrangement described is to be operated as a programmed shutter, the primary gear 127 of the governor assembly is made interlocked with the diaphragm lever 125 and the switching lever 116 is rotated to a position in which it locks the second pointer bearing plate 106. Once the coiled spring 119 is charged by a film winding operation, a shutter button, not shown, may be depressed. Upon depression of the shutter button, the shutter release lever 101 moves downward in the direction of arrow 101b, whereby the clamp plate 104 and the first pointer bearing plate 105 which follow the lower pin 102 thereon rotate toward the meter pointer 108, the clamp plate 104 initially urging the meter pointer 108 against the pointer abutment 109, followed by an abutment of the cam surface 105a of the pointer bearing plate 105 against the pointer 108. At this time, the control lever 111 has its free end located intermediate both operating pins 125d and 122b until the pointer bearing plate 105 rotates toward the meter pointer 108, whereupon it gradually moves upward, increasing the distance $l$ between the spacing between the both operating pins 125d and 122b and the width of the control lever 111 (hereinafter referred to as a gap $l$). Such a position is illustrated in FIG. 5. The gap $l$ is established in accordance with the position of the meter pointer 108. Subsequently, the release lever 120 is rotated by the pin 103 to release the drive wheel 118 for rotation, which therefore rotates in the direction indicated by an arrow 118c under the action of the coiled spring 119. Thereupon, the link 121 gradually moves downward and rotates the shutter drive lever 122 in the direction indicated by an arrow 122d. Consequently, the base plate 123 for the shutter blades is rotated to open the shutter blades 124. After rotating through the gap $l$, the operating pin 122b on the shutter drive lever 122 causes the diaphragm lever 125 to rotate through the control lever 111. Now the diaphragm lever 125 is rotated with a slow speed by virtue of the action of the governor assembly, and the base plate 114 which responds thereto also rotates at a slow speed, opening the diaphragm blades 113.

As the drive wheel 118 continues to rotate, the link 121 reverses its movement, namely, moves upward, and at this time, the shutter drive lever 122 rotates in the direction opposite to that indicated by arrow 122d whereby the diaphragm lever 125 is released from engagement with the governor assembly to reverse rapidly, causing the diaphragm blades 113 to be closed with a high speed, and also causing the shutter blades 124 to be closed through the retainer 122a of the shutter drive lever 122.

In this manner, the shutter blades 124 and the diaphragm blades 113 cooperate together with the governor assembly to provide an opening and closing operation of a triangular profile, and when opening, the shutter blades 124 are opened prior to the opening of the diaphragm blades 113. Thus, in this instance, the diaphragm blades 113 essentially function as shutter blades, and the amount of exposure is determined by the time interval during which the diaphragm blades 113 are opened. The aperture defined by the diaphragm blades 113 is determined by the gap $l$, which depends upon the position of the meter pointer 108 or on the brightness of an object being photographed.

When a picture is to be taken with a preset shutter speed, the switching lever 116 is rotated to a position in which it locks the first pointer bearing plate 105, and the diaphragm lever 125 is rotated clockwise by a switching ring, not shown, through the connecting pin 125e. As a consequence, the base plate 114 is rotated under the force of the spring 115 to hold diaphragm blades 113 in an open condition. On the other hand, depending on a shutter speed established by a shutter speed ring, not shown, the primary gear 127 has its projections 127a extending into the path of rotation of the projection 118a of the drive wheel 118. At this time, the diaphragm lever 125 is maintained clear of the primary gear by virtue of arcuate slot 127c. When a shutter button is depressed under this condition, the shutter release lever 101 moves downward to permit rotation of clamp plate 104 and the second pointer bearing plate 106 toward the meter pointer 108, the clamp plate 104 initially engaging and during the meter pointer 108 against the pointer abutment 109, followed by the engagement of the cam surface 106a of the pointer bearing plate 106 with the pointer 108. As a result, the diaphragm presetting lever 112, which is resiliently coupled with the pin 106c on the pointer bearing plate 106, rotates to displace the pin 114a on the base plate 114 with its other end, thereby determining a diaphragm aperture in accordance with the position of the meter pointer. As the release rod 101 is further depressed, the drive wheel 118 which is released from the engagement with the release lever 120, rotates in the direction of arrow 118c, causing a rapid rotation of the shutter drive lever 122 until the projection 118a engages the projection 127a, thus finally opening the shutter blades 124. Subsequently, the engagement between the projections 118a and 127a is effective to retard the rotation of the drive wheel 118 for a fixed period of time by the action of the primary gear 127, and when the projection 118a is depressed from the projection 127a, the drive wheel 118 again rotates rapidly, closing the shutter blades 124. Thus, the period of time during which the rotation of the drive wheel is retarded varies with the rotation of the shutter ring or the position of the projection 127a. Consequently, by causing the meter pointer 108 to be displaced according to the rotation of the primary gear 127 of the governor assembly, the diaphragm aperture can be determined in accordance with any desired shutter speed established; that is, a picture can be taken with a preset shutter speed.

In a manual operation, the switching lever 116 is rotated to bring its detent piece 116a into the position in front of the folded pieces 105b, 106b of the first and second pointer bearing plates 105 and 106 to prevent the rotation of these plates, and the diaphragm ring is rotated, whereupon the auto-manual switching cam which is interlocked with the diaphragm ring bears against the connecting pin 125e on the diaphragm lever 125 to disengage the diaphragm lever 125 from the pin 114b of the base plate 114, and at the same time the pin 114b is driven by an interlocking member, not shown, to establish a desired diaphragm aperture. The projection 127a of the primary gear 127 is moved into the path of the projection 118a of the drive wheel 118 in interlocked relationship with the movement of the shutter ring. A film winging operation may take place and the shutter button may be depressed. When the shutter button is depressed, the drive wheel 118 is released for rotation, and during such rotation, the projection 118a engages with the projection 127a, which engagement is maintained for a given period of time, during which it rotates with a reduced speed. The shutter drive lever 122 which is interlocked with the drive wheel 118 operates to open or close the shutter blades 124 through the base plate 123, thus enabling a manually set graphic operation.

In this manner, with this embodiment, a programmed shutter operation is permitted by locking the second pointer bearing plate 106 by means of the switching lever 116 and making the primary gear 127 of the governor assembly interlocked with the diaphragm lever 125, while a photographic operation with a preset shutter speed is permitted by locking the first pointer bearing plate 105 by means of the switching lever 116 and by making the primary gear 127 interlocked with the drive wheel 118 for a given period of time. Also by locking the both pointer bearing plates 105 and 106 by means of the switching lever 116 and by making the primary gear 127 interlocked with the drive wheel 118 for a given period of time, a manual photographic operation can be achieved in which the diaphragm aperture can be arbitrarily established by means of the diaphragm ring independently from a shutter speed.

FIG. 6 shows another embodiment of the apparatus according to the invention which permits a programmed photographic operation or a photographic operation with a preset shutter speed to be selectively achieved by causing the interlocking relationship between the shutter blades and the shutter drive mechanism which drives the shutter blades in response to a shutter release operation to be selectively released by the switching mechanism which selects a photographic operation, with a switching operation of the switching mechanism causing the governor assembly to be engaged with the shutter drive mechanism in response to the shutter drive mechanism in a manner such that the buffering function of the governor assembly is activated before the shutter blades are opened. Referring to FIG. 6, a shutter release lever 201 operates in the same manner as before, that is, move downward in response to a depression of a shutter button, not shown, and has a pair of pins 202 and 203 fixedly mounted on its lower and upper ends. An interlocking lever 204 and an auxiliary lever 205 are rotatably mounted on a common pivot 204c in overlying relationship, and have their one lateral edge abutting against the lower pin 202. The levers 204 and 205 are resiliently coupled with the pin 202 by means of springs 204a and 205a, respectively. The interlocking lever 204 is pivotally mounted at its center, and its end remote from the end which abuts against the pin 202 is bifurcated to form a channel 204b, which is engaged by a diaphragm presetting lever 206, which forms a diaphragm presetting mechanism E together with a pointer bearing plate 208 to be described later. At its center, the diaphragm presetting lever 206 is pivotally mounted on a common pivot 207a together with one end of a clamp plate 207 and a pointer bearing plate 208, and has three radially extending arms 206a, 206b and 206c. A pin 206d which engages the channel 204b of the interlocking lever 204 is fixedly mounted on the upper surface of the first arm 206a. The diaphragm presetting lever 206 has an operating pin 206e fixedly mounted on the underside of the first arm 206a, and has its second arm 206b bearing against a pin 208c mounted on a folded piece 208a which is formed on the marginal edge of the pointer bearing plate 208. The third arm 206c bears against a pin 209a fixedly mounted on the outer periphery of an annular base plate 209 for diaphragm blades, the arm 206c engaging the pin from the side thereof which is located forwardly in viewed in the direction of rotation thereof. The clamp plate 207 and the pointer bearing plate 208 are resiliently coupled together by means of a spring 210, and have their one lateral edge disposed opposite to a meter pointer 212 which moves in accordance with the brightness of an object being photographed. The meter pointer 212 is adapted to translate along a pointer abutment 213, and the arrangement is such that the pointer is held against the abutment 213 by the clamp plate 207 before a saw-toothed cam surface 208b formed along one lateral edge of pointer bearing plate 208 can bear against the pointer. The base plate 209 for diaphragm blades is biased by a spring 214 for rotation in one direction, and carries a plurality of diaphragm blades 215 (only one being shown) which are pivotally mounted thereon at equal intervals and are adapted to be opened when the base plate rotates under the action of the spring 214. An annular base plate 216 for shutter blades is juxtaposed with the base plate 209, and carries a plurality of shutter blades 217 (only one being shown) which are pivotally mounted thereon and are adapted to be opened when the base plate 216 is rotated in the same direction as that of the base plate 209. The auxiliary lever 205 is pivotally mounted on the same pivot as the interlocking lever 204 at its intermediate position, and has a sliding surface 205b formed on its one end which slides against the operating pin 206e on the diaphragm presetting lever 206 in the direction indicated by arrow 205d. The other end of the auxiliary lever 205 is pivotally connected, by means of pivot 205c, with the base end of a control lever 218 which constitutes a shutter speed presetting mechanism F together with the auxiliary lever 25. The control lever 218 has a progressively increasing width toward its free end, and has an abutment pin 218a fixedly mounted on the underside of the free end. A set gear 219 is mounted on a shaft 219b, and is rotated during a film winding operation, and pivotally mounted on the shaft 219b is a drive wheel 220 which is formed with a projection 220a at a portion of its outer periphery and is also provided with a drive pin 220b adjacent to the outer periphery. A coiled spring 221 is disposed between the set gear 219 and the drive wheel 220. A stop pin 219a is fixedly mounted on the underside of the set gear 219 and engages with the projection 220a of the drive wheel 220. The projection 220a of the drive wheel 220 is engaged with one end of a release lever 222, and thus is prevented from rotation. The release lever 222 has its other end extending forwardly of the upper pin 203 on the shutter release lever 201, and is rotated by the pin 203 to release the drive wheel 220 for rotation after the control lever 218 has moved upward in response to a rotation of the pointer bearing plate 208 toward the meter pointer 212 upon a shutter release operation. The free end of the drive pin 220b is pivotally connected with one end of a link 223, the other end of which is pivotally connected with a shutter drive lever 224, which is in turn rotatably mounted on a pivot 224d at its center. At its one end, the lever 224 is bifurcated to form a channel 224a which is engaged by a pin 216a fixedly mounted on the base plate 216 for opening or closing the shutter blades 217 in response to a rotation thereof. The lever 224 is formed with a laterally extending projection 224b which bears against the pin 218a on the conotrol lever 218, and constitutes a shutter drive mechanism G together with the drive wheel 220 and the link 223. Pivotally mounted on the pivot 224d for the shutter drive lever 224 is a diaphragm lever 225 which comprises a diaphragm drive mechanism. The lever 225 has three arms 225a, 225b and 225c which extends radially from the pivot, the first arm 225a bearing against the pin 209b fixedly mounted on the base plate 209 for the diaphragm blades, the second arm 225b carrying an operating pin 225d which bears against the lateral side of the control lever 218, and the third arm 225c carrying a pin 225e. The diaphragm lever 225 is normally urged by a spring 226 to a position in which its first arm 225a causes the base plate 209 to close the diaphragm blades 215 against the force of spring 214. Bearing against the pin 225e are an arm 227a of a primary gear 227 which forms part of a governor assembly 229, operative to apply a breaking force to the diaphragm lever 225, and also one lateral edge of a switching lever 228 which constitutes a switching mechanism for selecting a photographic operation, the lever 228 being pivotally mounted at 228a at its center.

The governor assembly 229 comprises an anchor 230 mounted on an anchor lever 231 which is pivotally mounted at 231b. The outer end of the lever 231 carries a pin 231a which bears against the other end 224c of the shutter drive lever 224, thus keeping the anchor 230 removed from escape wheel 232 against the force of a spring 231c.

Figure 7:
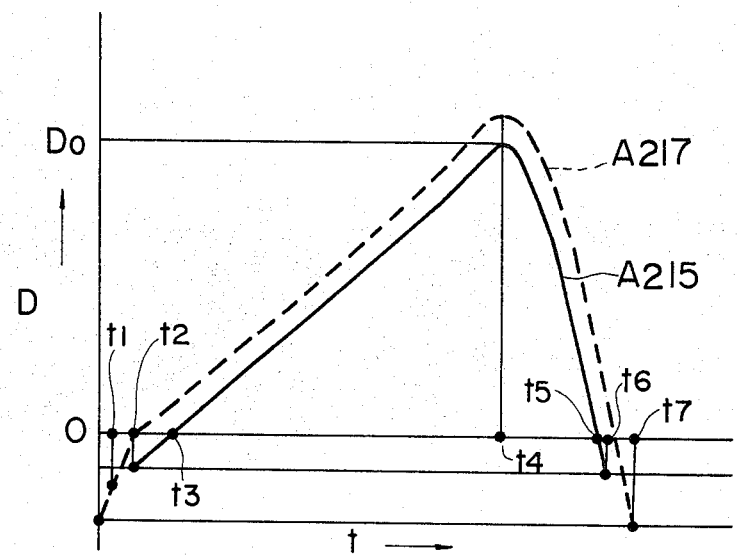
FIG. 7 is a diagram showing the variation of the diaphragm and shutter apertures against time in a programmed type exposure operation.

In operation, when it is desired to take a picture by using the described arrangement as a programmed shutter, the switching lever 228 is operated to bring the first arm 225a of the diaphragm lever 225 into abutment against the pin 209b on the base plate 209 and to bring the operating pin 225d of the diaphragm lever 225 and the projection 224b of the shutter drive lever 224 into abutment against the lateral edge of the control lever 218 and the abutment pin 218a, respectively. Subsequent to a film winding operation to charge the coiled spring 221, a shutter button may be depressed. Thereupon, the shutter release lever 201 is moved in the direction of release (arrow 201a), whereby the interlocking lever 204 and the auxiliary lever 205 follow the lower pin 202 on the shutter release lever 201, the interlocking lever 204 causing the diaphragm presetting lever 206, clamp plate 207 and the pointer bearing plate 208 to rotate integrally. As a consequence, the clamp plate 207 initially bears against the meter pointer 212, urging it against the pointer abutment 213, followed by the abutment of the pointer bearing plate 208 against the meter pointer 212. In so doing, the diaphragm presetting lever 206 is rotated to a position which depends on the position of the meter pointer 212 or the brightness of an object being photographed, and the operating pin 206e thereon allows the sliding surface 205b of the auxiliary lever 205 to be moved in contact therewith, thus rotating the auxiliary lever 205 and establishing a desired position for the control lever 218 which depends on the brightness of an object being photographed. As a consequence, the desired gap $l$ is established between the control lever 218 and the operating pin 225d on the diaphragm lever 225, in the similar manner as described previously in connection with FIG. 5. Subsequently, the release lever 222 is rotated by the pin 203 to release the drive wheel 220, which is therefore rotated in the direction of arrow 222c under the action of the coiled spring 221. Thereupon, the link 223 moves downward to rotate the shutter drive lever 224 in the direction of arrow 223a. The lever 224 rotates rapidly for an interval corresponding to the gap $l$, causing accompanying movement of the base plate 216 to rapidly open the shutter blades 217. The operation of the shutter blades 217 is indicated in FIG. 7 by broken line curve A217 wherein the time interval during which the shutter drive lever 224 rotates through the gap $l$ is indicated by $t_2$. In FIG. 7, the abscissa represents time $t$ while the ordinate represents an aperture D. During the interval from $t = 0$ to $t = t_2$, the shutter blades 217 move rapidly within an extent in which the respective blades 217 are overlapping each other. At $t_2$, the projection 224b of the shutter drive lever 224 causes the control lever 218 to bear against the operating pin 225d on the diaphragm lever 225. On the other hand, as the shutter drive lever 224 rotates, the anchor lever 231 also rotates, and meshes with the escape wheel 232 at $t_1$ ($t_1 < t_2$). As a consequence, from the time $t_2$ on, the shutter drive lever 224 is engaged with the governor assembly 229 through the control lever 218, diaphragm lever 225 and the primary gear 227 of the governor assembly, thus causing the shutter blades 217 to open with a reduced speed by the action of the governor assembly 229.

After time $t_2$, the diaphragm lever 225, which has been abutting against the primary gear 227 of the governor assembly, is urged by the shutter drive lever 224 to commence its rotation at reduced speed, whereby the diaphragm blades 215 also begin to open with a reduced speed as indicated by solid line curve A215 in FIG. 7. Subsequently, the diaphragm blades 215 and the shutter blades 217 continue their opening movement at a low speed, and become fully open (D = $D_o$) when the shutter drive lever 224 reverses its movement, that is, at $t = t_4$. Subsequently, the shutter drive lever 224 rotates in the opposite direction from that indicated by arrow 223a in FIG. 6, causing the shutter blades 217 to be closed rapidly. Also the diaphragm blades 214 are rapidly closed by a rotation of the diaphragm presetting lever 225 under the action of the spring 226. At $t_5$, the apertures defined by the diaphragm blades 215 and by the shutter blades 217, respectively, reach a null aperture, or D = 0. At $t_6$, the diaphragm blades 215 return to their initial position, while the shutter blades 217 return to the initial position at $t_7$. The anchor 230 is disengaged from the escape wheel 232 during the interval intermediate the time $t_6$ and the time $t_7$. Thus it will be seen that the shutter blades 217 initiate their movement prior to the diaphragm blades 215, so that the control of the amount of exposure is performed by the diaphragm blades 215. The amount of rotation of the diaphragm lever 225 is related with the gap $l$, which depends on the position of the meter pointer 212, and thus the control of the amount of exposure is ultimately dependent on the position of the meter pointer 212.

When taking a picture with a preset shutter speed operation, the switching lever 228 is operated to rotate the diaphragm lever 225 against the force of spring 226 so as to disengage the first arm 225a and the operating pin 225d of the diaphragm lever 225 from the pin 209b of the base plate 209 and the control lever 218, respectively. Thus, the shutter drive mechansim G comprising the drive wheel 220, link 223 and the shutter drive lever 224 is disconnected from the diaphragm blades 215. As a consequence, the base plate 209 for the diaphragm blades rotates under the action of the spring 214. The primary gear 227 of the governor assembly 229 will be moved by pin 225e so as to have its arm 227a displaced into the path of rotation of the projection 220a of the drive wheel 220. Thus, when a shutter button is depressed subsequent to a film winding operation, the shutter release lever 201 is moved in the direction of release operation, and the interlocking lever 204 which follows the movement of the pin 202 causes the diaphragm presetting lever 206, the clamp plate 207 and the pointer bearing plate 208 to rotate. Hence, the clamp plate 207 and pointer bearing plate 208 bear against the meter pointer 212, and the diaphragm presetting lever 206 and hence the base plate 209 for the diaphragm blades is rotated to a position which depends on the position of the meter pointer 212, the diaphragm blades 215 then define an aperture which depends on the position of the meter pointer 212 or the brightness of an object being photographed.

Figure 8:
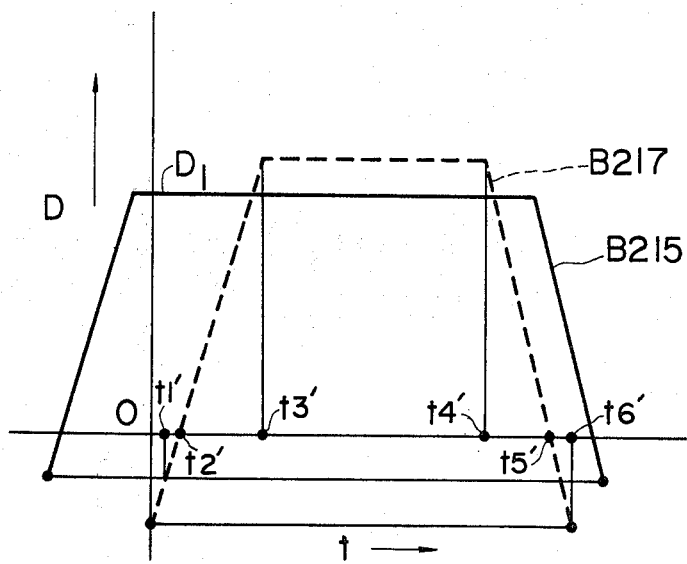
FIG. 8 is a diagram showing the variation of the diagram and shutter apertures against time in an exposure operation of an electric-eye followed shutter speed type.
Figure 9:
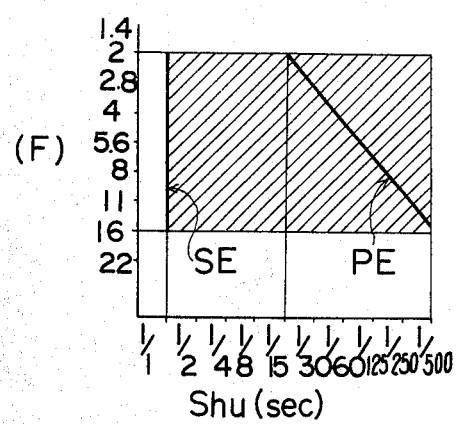
FIG. 9 is a diagram showing the relationship between a diaphragm aperture and a shutter speed in the EE exposure mechanism.

FIG. 8 graphically shows the relationship between the aperture D of the diaphragm blades 215 and the shutter blades 217 plotted against time $t$ in a photographic operation with a preset shutter speed. The aperture defined by the diaphragm blades 215 is indicated by solid line curve B215, while the aperture defined by the shutter blades 217 is indicated by broken lines B217. As indicated, the diaphragm blades 215 open to an aperture $D_1$ which depends on the position of the meter pointer 212, prior to the opening movement of the shutter blades 217. The aperture $D_1$ corresponds to the maximum aperture. Subsequently, the drive wheel 220 is released for rotation, rotating drive lever 224 in turn. As a consequence, the shutter blades 217 are opened rapidly. At $t_1'$, the anchor 230 meshes with the escape wheel 232 of the governor asembly 229. The aperture defined by the shutter blades remains zero until $t_2'$ when the overlapping between the respective shutter blades 217 becomes null, and the continued opening movement achieves an aperture in excess of $D_1$ after $t_3'$, at which time $t_3'$ the projection 220a of the drive wheel 220 engages with the arm 227a of the primary gear 227. Thereupon, the buffering function of the governor assembly 229 is activated, and subsequently the shutter blades 217 are closed with a low rate while maintaining an aperture in excess of $D_1$ until the time $t_4'$ when the projection 220a is disengaged from the arm 227a of the primary gear 227, whereupon the shutter blades 217 are rapidly close to reach a condition of null overlapping at $t_5'$ or an aperture of D = 0, and returning to their initial position at $t'_6$.

It will be seen that the time interval during which the shutter blades 217 are maintained open or the time interval from $t_3'$ to $t_4'$ controlled by the position of the arm 227a of the primary gear 227 of the governor assembly, so that by turning a shutter speed ring to change the position of the primary gear 227 and the meter pointer 212, an EE photographing operation with a preset shutter speed is enabled.

With this embodiment, the switching lever 228 can be operated to selectively disengage the diaphragm lever 225 from the base plate 209 for the diaphragm blades and from the control lever 218, thereby permitting a photographic operation with a preset shutter speed. By using an arrangement whereby the shutter drive lever 224 causes the anchor 230 to be engaged with the escape wheel 232 of the governor assembly 229 until a null aperture D or a condition of null overlapping of diaphragm blades 215 is reached so as to activate the buffering function of the governor assembly 229, a single governor assembly can be used in either programmed photographic operation or a photographic operation with a preset shutter speed.

Figure 10:
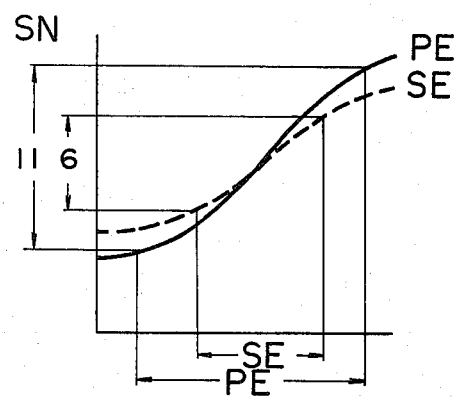
FIG. 10 is a diagram showing the relationship between the number of combinations of diaphragm apertures and shutter speeds and the extent of deflection of the pointer of an exposure meter.

Referring now to FIGS. 9 to 12, an apparatus incorporating a clamp plate having a stepped pointer bearing surface will be described. Generally, in an EE camera, if the meter pointer which moves in response to the brightness of an object being photographed has moved out of a proper range of deflection angle, that is, in the event a proper exposure is impossible, it is necessary to lock an exposure operation automatically. The range of deflection angle varies with exposure parameters which are designed into the EE mechanism. By way of example, FIG. 9 graphically shows the relationship between a diaphragm aperture F and a shutter speed Shu (in seconds) in a camera capable of taking a picture for a range of diaphragm values F2 to F16 and for a range of shutter speeds from 1 to 1/500 second. The shaded area represents the range within which a photographic operation is possible. As will be evident from this Figure, in a photographic operation with preset shutter speed, the range of deflection angle for the effective operation of the meter pointer may be divided into six steps from F2 to F16, as indicated at SE in the Figure. However, in a photographic operation of a programmed EE type, it may be necessary to take pictures with combinations of LV values from a diaphragm aperture of F2 and a shutter speed of 1/15 second to a diaphragm aperture of F16 and a shutter speed of 1/500 second by taking into consideration the limit imposed on the available shutter speeds which is caused by the oscillations produced by hand movement. Then, the deflection angle for the effective operation of the meter pointer will have to be in a number of steps which is equal in number to the sum of the steps of diaphragm apertures and the steps of shutter speeds, that is, 11 steps, as indicated at PE in the Figure. As a consequence, the range of the deflection angle for the effective operation of the meter pointer of the camera will be different for the programmed EE (shown at PE in FIG. 10) than for the EE operation with a preset shutter speed (shown at SE in FIG. 10), as shown in FIG. 10 in connection with the number of steps SN. Therefore, it will be seen that there has been a difficulty in the practical implementation of permitting more than one different EE photographic operation with a single camera, together with the capability to lock the exposure operation automatically in the event a proper exposure cannot be assured, because a complicated mechanism is required such as providing a plurality of exposure locking mechanisms which operate selectively for each individual EE photographic operation or providing a correction mechanism which corrects the deflection angle of the meter pointer depending on the individual photographic operations.

Figure 11:
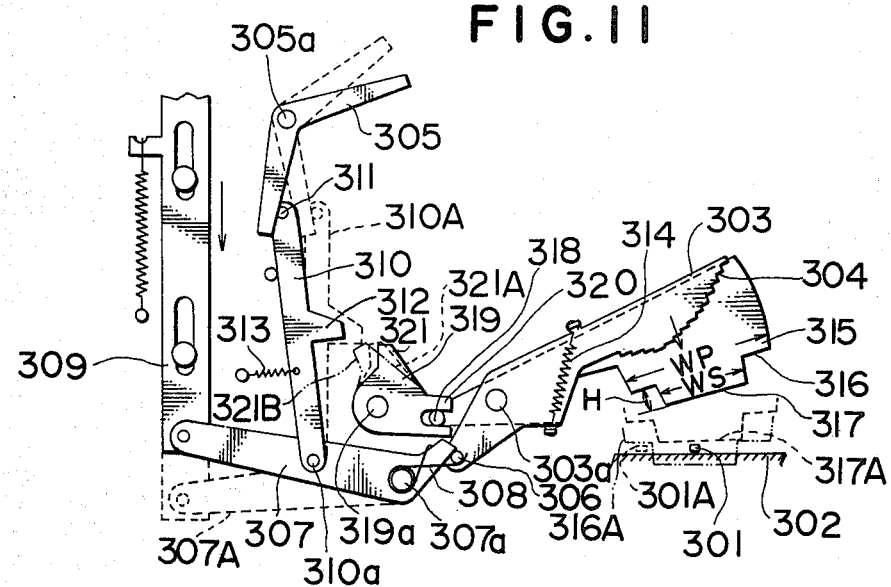
FIG. 11 is a front view of a shutter release locking mechanism under the situation when a proper amount of exposure can not be achieved.

The embodiment to be described has overcome such problem, permitting at least two EE exposures such as a programmed EE, a preset shutter speed EE or the like to be performed without failure. Referring to FIG. 11, a meter pointer 301 moves along a pointer abutment 302 to a deflection angle which depends on the brightness of an object being photographed. A pointer bearing plate 303 in the EE mechanism is rotatably mounted on a pivot 303a intermediate its length and is formed with a saw-toothed portion 304 along its lateral side which is located so as to confront to the pointer 301. Before bearing against the pointer 301, the plate 303 rotates through an angle which depends on the deflection angle of the pointer, causing an exposure amount to be automatically determined by the EE mechanism depending on the amount of such rotation. In the present embodiment, the EE mechanism is given two different exposure presetting parameters by an EE function select lever 305 to be described later, for selectively permitting a photographic operation with a preset shutter speed or a programmed EE photographic operation. A pin 306 is fixedly mounted on the other end of the plate 303 and engages with one end of an interlocking lever 307 under the action of a spring 308, the lever 307 being rotatably mounted on a pivot 307a intermediate its length. The other end of the interlocking lever 307 is pivotally connected with one end of a shutter release lever 309 which moves downward as indicated by an arrow when a shutter button is depressed, thereby transmitting the downward movement of the shutter release lever 309 to the pointer bearing plate 303 to cause its rotation. An engaging lever 310 has its one end pivotally connected at 310a with the interlocking lever 307 intermediate its length, and carries a switching pin 311 at its free end. The lever 310 is provided with a laterally extending projection 312 which extends from a central portion thereof, and is normally urged by a spring 313 to rotate in a direction away from the projection. The EE function select lever 305 is rotatably mounted on a pivot 305a and engages with the lever 310. Depending on the selected operation which the select lever 305 performs with respect to the EE mechanism in order to establish an amount of exposure, the lever 310 assumes the position shown in the solid line in a programmed operation, and assumes the position 310A shown in dotted lines in a photographic operation with a preset shutter speed.

A clamp plate 315 is rotatably mounted on the same pivot as the pointer bearing plate 303 in overlying relationship therewith, and is resiliently coupled thereto through a spring 314. The clamp plate 315 is formed with a pair of pointer bearing surfaces 316 and 317 in a stepped manner on its side facing the pointer 301. The first pointer bearing surface 316 has a width of WP, and is centrally formed with a projection of a width WS (Ws being less than WP) and a height H, the top surface of the projection defining the second pointer bearing surface 317. The width Wp of the first pointer bearing surface 316 of the clamp plate 315 is chosen to be coincident with the effective range of deflection angle of the meter pointer 301 within which a proper amount of exposure can be established in a programmed EE operation, and the width Ws of the second pointer bearing surface 317 is chosen to be coincident within the effective range of deflection angle of the pointer 301 within which a proper amount of exposure can be established in a photographic operation with a preset shutter speed. Stated differently, when the pointer 301 is located out of contact with the first pointer bearing surface 316 inclusive of the second pointer bearing surface 317, a photographic operation under a proper exposure is impossible in a programmed EE operation, while when the pointer 301 is located out of contact of the second pointer bearing surface 317, a photographic operation under a proper exposure can not be achieved in a preset shutter speed EE operation even though the pointer remains in abutment with the first pointer bearing surface 316. It will be seen that whether or not the meter pointer 301 is located within a required range of deflection angle is detected in terms of the amount of rotation until the clamp plate 315 bears against the pointer 301. As before, the clamp plate 315 rotates together with the pointer bearing plate 303, and is adapted to have its first or second pointer bearing surface 316, 317 in abutment against pointer 301 to prevent its movement prior the abutment of the plate 303 thereagainst. After a movement of the pointer 301 is inhibited by the clamp plate 315, the pointer bearing plate 303 rotates alone against the force of the spring 314 to have its saw-toothed portion 304 in abutment against the pointer 301. Each of the pointer bearing surfaces 316 and 317 is oriented to be parallel to the direction of deflection of the pointer 301 or the surface of the pointer abutment 302 when it bears against the pointer 301.

The clamp plate 315 carries a pin 318 at its end remote from the pointer bearing surface, which pin is engaged with a bifurcated channel 320 in a lock lever 319 which constitutes an exposure locking mechanism together with the engaging lever 310. The lock lever 319 is substantially L-shaped and is rotatably mounted on a pivot 319a which is located at the bend of the L-shape, and has its opposite end formed as a locking portion 321. The lock lever 319 rotates through an angle which depends on the amount of rotation of the clamp plate 315, and operates to inhibit an exposure only when the meter pointer 301 is shifted out of the range of deflection angle which is compatible with an exposure parameter selected by the EE function select lever 305, by engaging with the projection 312 of the correspondingly positioned lever 310. Thus, when the lever 310 assumes the position 310A indicated in dotted lines or the position for a photographic operation with a preset shutter speed, the clamp plate 315 will be located at position 317A indicated in dotted lines which permits the second pointer bearing surface 317 to bear against the pointer 301 if the pointer 301 lies within the range of deflection angle which is compatible with an exposure parameter. At this time, the lock lever 319 which is interlocked with the clamp plate 315 will be rotated so as to locate the locking portion 321 at a position 321A shown in dotted lines in which the locking portion 321 does not engage the projection 312. When the pointer 301 has shifted out of the range of deflection angle for the effective operation and assumes a position 301A shown in chain lines, the clamp plate 315 will bear against the pointer 301 at a portion of the first pointer bearing surface 316 exclusive of the second pointer bearing surface 317, as indicated by a position 316A shown in chain lines. Thus, the clamp plate 315 will rotate through an angle which is increased by an amount corresponding to the height H of the second pointer bearing surface, so that the lock lever 319 which is interlocked therewith will move so as to locate the locking portion 321 at a position 321B indicated in phantom lines for engagement with the projection 312 of the engaging lever 310 which then assumes a position 310A shown in dotted lines. When the engaging lever 310 assumes a position for a programmed EE operation, which is shown in solid line, the clamp plate 315 will bear against the pointer 301 with its first pointer bearing surface 316 if the pointer 301 lies within the range of deflection angle for the effective operation which is compatible with an exposure parameter. At this time, the lock lever 319 will rotate so as to locate the locking portion 321 at a position 321A shown in dotted lines or a position 321B shown in chain lines, but can not engage the projection 312. If the pointer 301 shifts out of the range of deflection angle, the clamp plate 315 will rotate through a further angle, whereby the locking portion 321 of the lock lever 319 can engage the projection 312. When the locking portion 321 of the lock lever 319 engages the projection 312 of the lever 310 in this manner, the lever 310 will be locked, thereby constraining the interlocking lever 307 to prevent a downward movement of the shutter release lever 309. In this manner, an exposure operation is automatically locked.

With the above arrangement, in a photographic operation of a programmed type, the EE function select lever 305 is positioned as shown in solid line, and a depression of the shutter button causes the shutter release lever 309 to move in the direction of the arrow, rotating the pointer bearing plate 303 and the clamp plate 315 integrally through the interlocking lever 307. The first cam surface 316 of the clamp plate 315 initially bears against the pointer 301 to prevent its movement, followed by the abutment of the saw-toothed portion 304 of the plate 303 against the pointer 301, whereby the EE mechanism establishes an amount of exposure automatically in response to such rotation of the plate 303, permitting a photographic operation under a proper exposure. If the pointer 301 is shifted out of the range of deflection angle for its effective operation, the locking portion 321 of the lock lever 319 which is interlocked with the clamp plate 315 will be engaged with the projection 312 of the lever 310, thus preventing a release operation of the shutter release lever 309 through the interlocking lever 307.

In a photographic operation with a preset shutter speed, the EE function select lever 305 is positioned as shown in dotted lines, and a depression of the shutter button will result in a sequential abutment of the second pointer bearing surface 317 of the clamp plate 315 and the cam portion 304 of pointer bearing plate 303 against the pointer 301 if the pointer 301 lies within the range of deflection angle for its effective operation, thus allowing the EE mechanism to establish an amount of exposure in response to such rotation of the plate 303. Thus a photographic operation under a proper exposure is assured. If the pointer 301 is shifted out of the range, the lever 310 will be locked by the lock lever 319, thereby automatically preventing a shutter release operation.

Figure 12:
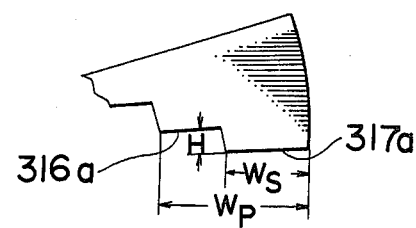
FIG. 12 is a front view showing an example of the clamp plate.

The clamp plate is not limited to the shape shown in FIG. 11, but the second pointer bearing surface may be formed at one end of the first pointer bearing surface 316a, as shown at 317a in FIG. 12.

While the above embodiment has been described as accommodating a programmed photographic operation and a photographic operation with the preset shutter speed, the invention is equally applicable to accommodating other combinations of photographic operations or accommodating more than two photographic operations. In such instance, the pointer bearing plate may have a number of pointer bearing surfaces depending on the number of photographic operations accommodated and the position of the detent lever suitably chosen.

Figure 13:
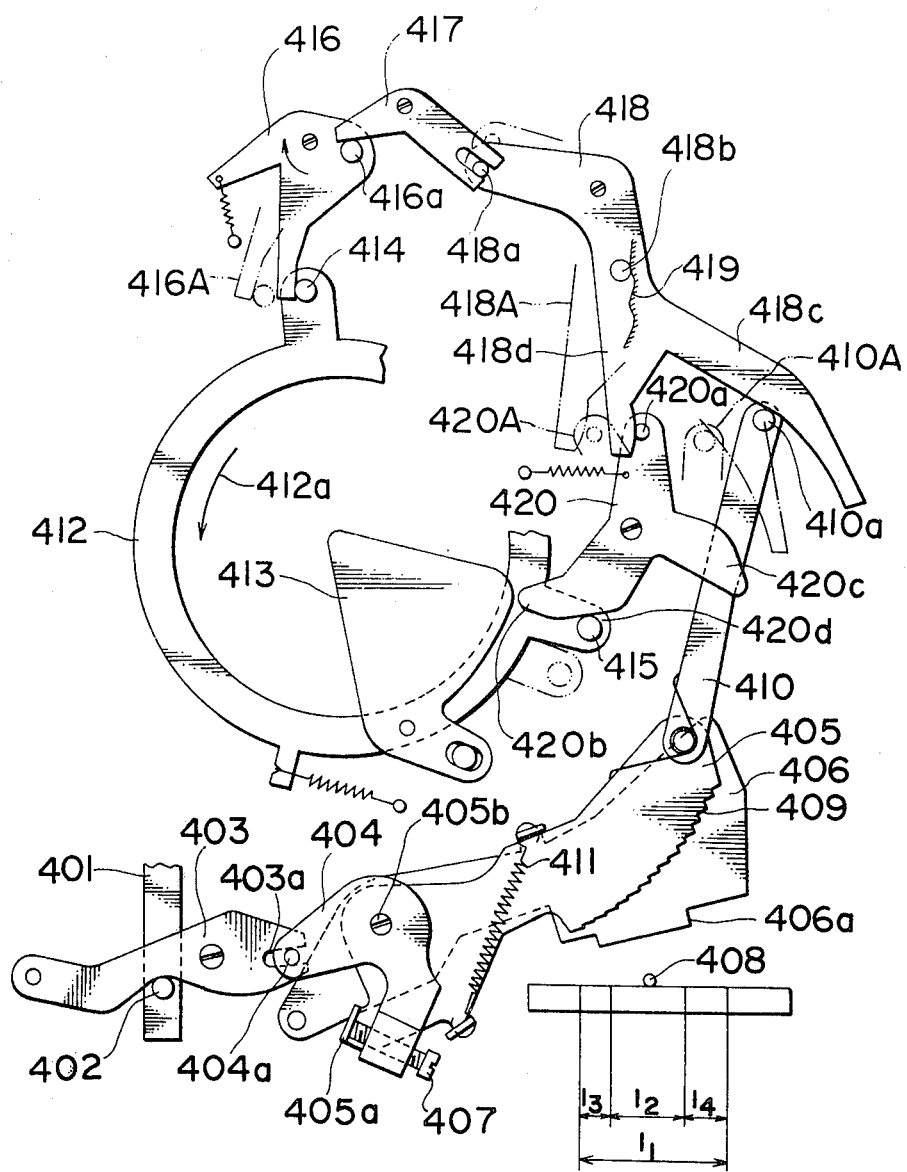
FIG. 13 is a front view of a mechanism which provides a mechanical correction to a diaphragm aperture.

FIG. 13 shows another embodiment of the apparatus according to the invention which provides a mechanical correction of a photometric value as between a programmed photographic operation and a photograpfic operation with a preset shutter speed. Referring to FIG. 13, a shutter release lever 401 is adapted to move downward in response to a depression of a shutter button, not shown, and carries a pin 402 at its one end, which resiliently bears against an interlocking lever 403 which is in turn pivotally mounted intermediate its length and is formed with a bifurcated channel 403a at its other end. An adjusting lever 404 is pivotally mounted at its center on a common pivot 405b also pivotally mounting a pointer bearing plate 405 and a clamp plate 406 disposed in overlying relationship therewith. The lever 404 carries an interlocking pin 404a at its one end which is fitted into the bifurcated channel 403a, and threadably receives a screw 407 in its other end, the screw 407 bearing against a folded piece 405a formed at one end of the pointer bearing plate 405 so as to permit an adjustment of the relative position of the plate 405 and the interlocking lever 403. Toward its other end, the pointer bearing plate 405 is laterally formed with a saw-toothed portion 409, and is pivotally connected with one end of a diaphragm urging lever 410 at its free end. The saw-toothed portion 409 is adapted to bear against a meter pointer 408 which deflects in accordance with the brightness of an object being photographed. The clamp plate 406 is resiliently coupled with the plate 405 by means of a spring 411, and is formed with a stepped abutment 406a along its one lateral edge, the abutment 406a being raised centrally. An exposure mechanism comprises an annular base plate 412 having a plurality of exposure blades 413 (only one being shown) mounted on its periphery, and carrying a pair of circumferentially spaced pins 414 and 415. One of the pins 414 resiliently bears against one end of a diaphragm blade drive lever 416 which is rotatably mounted. The drive lever 416 is arranged such that it rotates in the direction indicated by an arrow at a low speed, by a force from a drive source (not shown) in response to a shutter release operation when a photographic operation switching ring, not shown, is switched to a programmed photographic operation, and then reverses or rotates in the opposite direction rapidly to return to its initial position. The arrangement is such that the amount of rotation of the drive lever 416 varies with the rotational position of the interlocking lever 403 which is determined by the position of the meter pointer 408. The drive lever 416 carries a pin 416a which engages with one end of an engaging lever 417 which is rotatably mounted. The other end of the engaging lever 417 is bifurcated to form a channel into which is fitted a pin 418a extending from one end of a switching lever 418 which is pivotally mounted at its center and which forms a switching mechanism. The other end of the switching lever 418 is channel-shaped with a sliding pin 418b located at the base thereof for sliding contact with a photographic operation switching cam surface 419 which is formed on the barrel (not shown) of a photographic lens. One limb 418c at the channel-shaped end of the switching lever 418 is held in sliding contact with a pin 410a which is located on the opposite end of the diaphragm urging lever 410, while the other limb 418d is maintained in sliding contact with a pin 420a provided on a first arm of a diaphragm presetting lever 420 which is centrally pivotally mounted and has three radially extending arms. A second arm of the diaphragm presetting lever 420 is provided with a cam surface 420b which bears against the pin 415 on the base plate 412 and also with a cutout 420d which avoids interference with movement of the pin 415, while a third arm of the diaphragm presetting lever 420 is provided with a cam surface 420c which is adapted to bear against the pin 410a on the diaphragm urging lever 410. The cutout 420d is profiled so that when the exposure presetting lever 420 assumes the position shown in solid line, a maximum rotation of the base plate 412 does not result in an abutment of the pin 415 thereagainst. A second annular base plate, not shown, is coaxially provided with the base plate 412 for opening or closing shutter blades, not shown.

Figure 15:
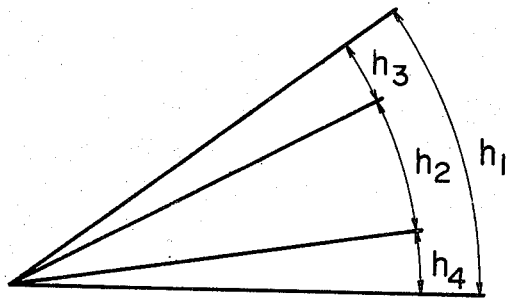
FIg. 15 is a diagram illustrating the extent of deflection of a pointer bearing plate.

In operation, when taking pictures in a programmed photographic operation, the switching lever 418 is set in the position shown in solid line in FIG. 13. When a shutter button is depressed to move the release lever 401 downward, the diaphragm blade drive lever 416 rotates in the direction indicated by an arrow at a low speed. The base plate 412 also rotates with a low speed in following relationship at the movement of the lever 416, causing a gradual opening of the diaphragm blades 413. After rotating through an amount which depends on the brightness of an object being photographed, the drive lever 416 reverses, rapidly rotating in the opposite direction to close the diaphragm blades 413. As a consequence, when a conventional means is used to vary the amount of rotation of the drive lever 416 with a deflection of the meter pointer 408 within a range $l1$, or with a rotation of the pointer bearing plate 405 within a range $h1$ (see FIG. 15), a programmed photographic operation is enabled.

In a photographic operation with a preset shutter speed, the switching ring is rotated to cause the cam surface 419 to rotate the switching lever 418 to a position 418A shown in phantom lines. Such a switching operation of the switching lever 418 causes the drive lever 416 to be rotated by a greater extent in the direction of the arrow, as indicated by a position 416A shown in phantom lines, thus releasing the lever 416 from engagement with the pin 414. Thus the base plate 412 is permitted to rotate to a greater degree in the direction of arrow 412a, thereby achieving a maximum aperture defined by the blades 413. The switching operation of the switching lever 418 also causes the diaphragm urging lever 410 and the exposure presetting lever 420 to be displaced to positions 410A and 420A shown in phantom lines. Thus, the pin 415 on the base plate 412 moves into abutment against the cam surface 420b of the exposure presetting lever 420.

Figure 14:
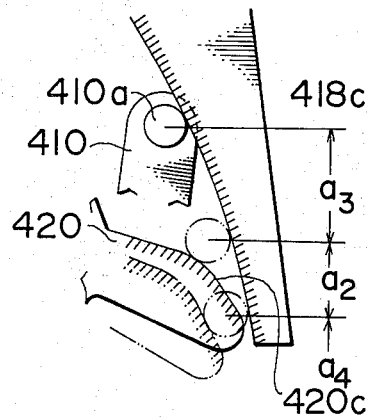
FIG. 14 is a fragmentary front view showing the relationship between a diaphragm urging lever, a diaphragm presetting lever and a switching lever.

When the release lever 401 moves downward under such condition, the pointer bearing plate 405 rotates by an amount depending on the position of the meter pointer, causing the diaphragm urging lever 410 to be displaced downward. As indicated in FIG. 14, the effect of the descending diaphragm urging lever 410 is such that within an interval $a3$, it does not operate on the exposure presetting lever 420, but rotates the lever 420 within an interval $a2$, and again becomes inoperative within an interval $a4$. Thus, the lever 420 is subjected to a rotational displacement depending on the amount of descent of the diaphragm urging lever 410 only within the interval $a2$. On the other hand, the pin 415 on the base plate 412 is maintained in abutment against the cam surface 420b of the exposure presetting lever, and is driven by the displacement of the diaphragm presetting lever 420. As a result, the blades 413 define an aperture which depends on the position of the meter pointer, thus operating as diaphragm blades. By making the intervals a2, a3 and a4 through which the diaphragm urging lever 410 operates correspond to the deflection intervals l2, l3 and l4 of the pointer 408 and the intervals h2, h3 and h4 through which the pointer bearing plate 405 rotates, it is possible to operate the shutter blades for an optimum diaphragm aperture only within the interval l2 of the meter pointer in a photographic operation with a preset shutter speed. When the release rod is further depressed, shutter blades, not shown, are operated, thus performing a photographic operation with a preset shutter speed.

In this manner, both programmed photographic operation and a shutter operation with a preset shutter speed are enabled in a single camera without changing deflection of the meter pointer.

While in the embodiment described above, the invention has been applied to a camera which permits a programmed photographic operation and a photographic operation with a preset shutter speed, it should be understood that the invention can equally be applied to a camera capable of performing a plurality of photographic operations including one with a preset diaphragm aperture.

Figure 16:
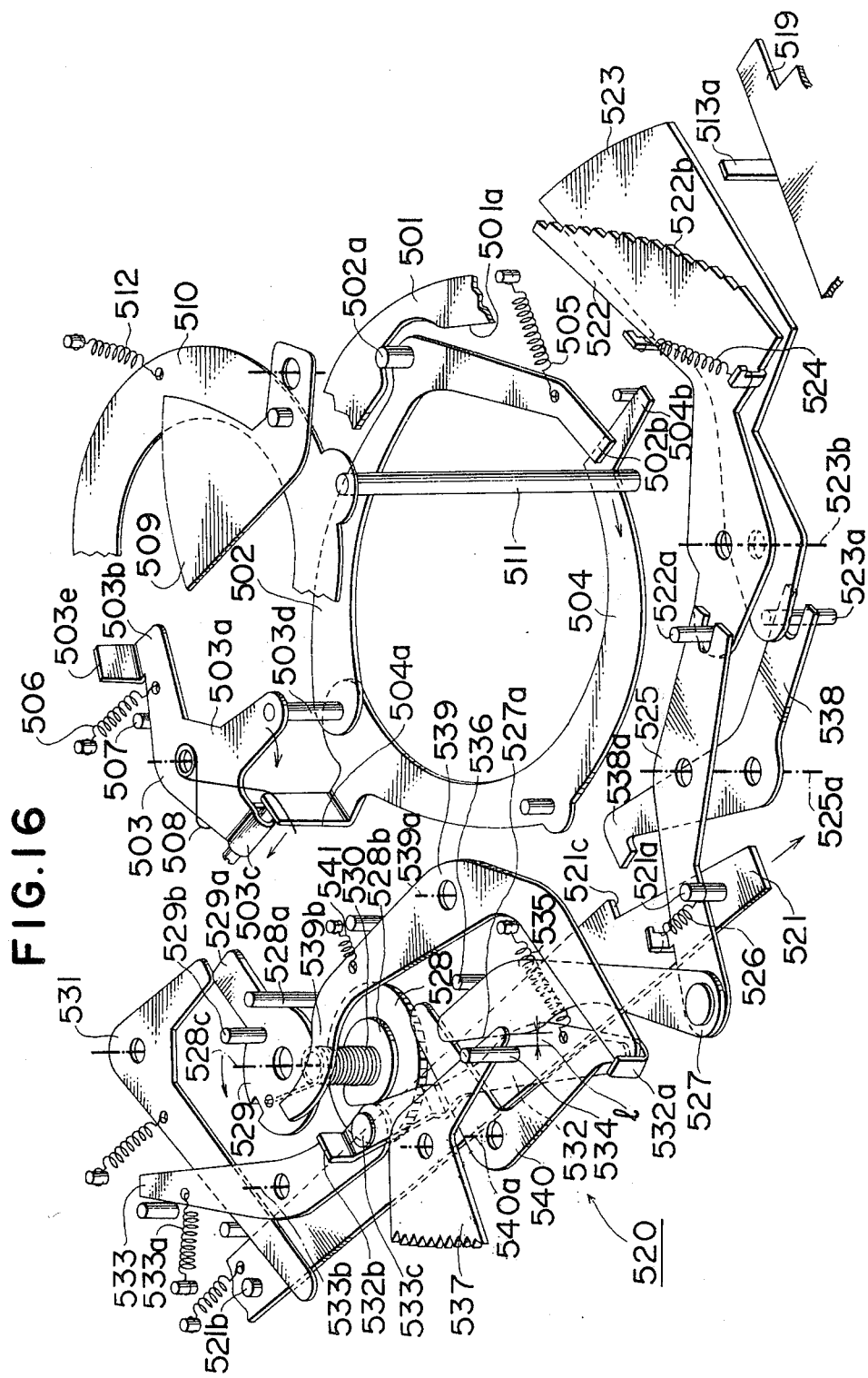
FIG. 16 is a perspective view of the EE exposure apparatus according to an additional embodiment of the invention.
Figure 17:
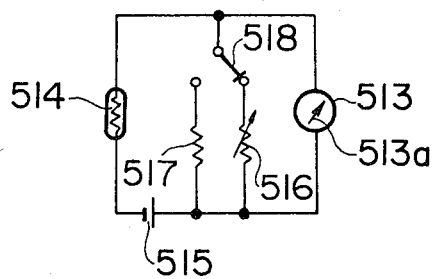
FIG. 17 is a circuit diagram of a photometric apparatus having its resistance switched when an electronic flash or an auto-strobo unit is and is not mounted.

Referring to FIG. 16, there is shown a further embodiment of the apparatus according to the invention which is essentially constructed as an EE exposure apparatus with a preset diaphragm aperture and to which an auto-strobo unit can be applied. Referring to FIG. 16, a diaphragm cam 501 which rotates in interlocked relationship with a diaphragm ring is annular in configuration (only a portion thereof being shown) and is formed with a cam surface 501a along its inner peripheral surface. Inside the diaphragm cam are disposed a diaphragm lever 502 which constitutes a diaphragm presetting mechanism together with the diaphragm cam 501, and also an FM lever 504 which together with a switching lever 503 constitutes a diaphragm presetting mechanism in a flashlight photographing operation. The diaphragm lever 502 and the FM lever 504 are both arcuate in configuration and have their ends disposed in overlying relationship to form a ring configuration. The switching lever 503 is pivotally mounted at its center and has three arms 503a, 503b and 503c which extend radially from the pivot therefor. The first arm 503a carries a pivot 503d at its free end, on which the overlapping end portions of the diaphragm lever 502 and the FM lever 504 are rotatably mounted. The diaphragm lever 502 is provided with a cam pin 502a intermediate its ends, and is urged by a spring 505 which extends between the end thereof which is remote from the pivotal connection with the FM lever 504 and the camera body so as to cause the cam pin 502a to bear against the cam surface 501a of the diaphragm cam 501 resiliently. The second arm 503b of the switching lever 503 is formed with a switch operating tongue 503e at its free end, and the lever 503 is urged by a spring 506 extending between the arm 503b and the camera body to normally cause the arm 503b to bear against a stop pin 507 resiliently. A spring 508 acting between the third arm 503c of the switching lever 503 and an abutment 504a which is formed adjacent to one end of the FM lever 504 serves to resiliently couple the switching lever 503 and the FM lever 504 together. At its other end, the FM lever 504 is formed with an engaging piece 504b which extends outwardly. A diaphragm mechanism comprises a plurality of diaphragm blades 509 (only one being shown) which are pivotally mounted at equal intervals on one surface of an annular base plate 510 axially aligned with and spaced from the diaphragm cam 501, and is constructed to establish a desired diaphragm aperture depending on the amount of rotation of the base plate 510. The base plate 510 has a pin 511 fixedly mounted at a location on its periphery, and is urged by a spring 512 extending between the base plate and the camera body to cause the pin 511 to bear resiliently against one or both of the free end 502b of the diaphragm lever 502 and the engaging piece 504b of the FM lever 504. Referring to FIG. 17, a meter 513 having a pointer 513a is connected in series with a photoelectric transducer element 514 across a battery 515. The meter 513 is shunted by a series connection of a common changeover switch 518 and either a variable resistor 516 or a fixed resistor 517. The resistor 516 has a resistance which varies in accordance with a diaphragm aperture defined by the diaphragm blades 509, while the resistance of the fixed resistor 517 is determined by an auto-strobo unit, not shown, which is to be mounted on the camera. Normally the switch 518 is thrown to connect the variable resistor 516 in circuit, and when a switching manipulation for flashlight photographing is made as by mounting the auto-strobo unit, the switching lever 503 is rotated to cause the tongue 503e to connect the fixed resistor 517 with the battery 515. The pointer 513a (see FIG. 16) of the meter 513 will deflect along a pointer abutment 519 in accordance with a diaphragm aperture established by the diaphragm blades 509 and the brightness of an object being photographed as sensed by the photoelectric transducer element 514.

Referring to FIG. 16, an EE mechanism which responds to a shutter release operation of a shutter release lever 521 for driving a shutter mechanism, not shown, which is previously located depending upon the position of the meter pointer 513a will be described. A pointer bearing plate 522 and a clamp plate 523 are disposed in overlying relationship and are rotatably mounted on a common pivot 523b intermediate their ends, and are resiliently coupled together by means of a spring 524. These plates carry pins 522a and 523a at their first ends. A connecting lever 525 which is rotatably mounted on a pivot 525a at its center has its one end bifurcated to engage the pin 522a on the pointer bearing plate 522, while the other end thereof resiliently bears against a pin 521a with its one lateral side under the action of a spring 526, the pin 521a being fixed on the free end of the shutter release lever 521. The free end of the connecting lever 525 is pivotally connected with one end of a control lever 527 having a cam portion 527a which is tapered toward its other end. The connecting lever 525 moves in response to a shutter release operation of the shutter release lever 521, causing a rotation of the pointer bearing plate 522 together with the clamp plate 523. Initially, the clamp plate 523 holds the meter pointer 513a against the pointer abutment 519, followed by a rotation of the pointer bearing plate 522 alone against the force of spring 524. Thereupon, a saw-toothed portion 522b formed along one lateral side of the plate 522 is brought into abutment against the pointer 513a, thereby determining the position of the control lever 527 in accordance with the position of the pointer. A set gear 528 which is interlocked with a film winding operation is mounted on a pivot 528c, and on the same pivot is mounted a disc-shaped drive wheel 529. The drive wheel is provided with a radially outwardly extending projection 529a and also carries an upwardly extending drive pin 529b. A coiled spring 530 is disposed between the drive wheel 529 and the set gear 528, the respective ends of the spring 530 being engaged with an opening near the outer periphery of the drive wheel 529 and a stop pin 528a extending upwardly from the set gear 528. The stop pin 528a engages with the projection 529a of the drive wheel 529. A set cam 528b is integrally mounted on the upper surface of the set gear 528, and has its outer peripheral surface formed as a cam surface. The coiled spring 530 is charged by a film winding operation for energizing the drive wheel 529. However, a rotation of the drive wheel 529 is prevented by abutment of the projection 529a against one end of a release lever 531, the other end of which extends into the path of travel of a release pin 521b fixedly mounted on the other end of the shutter release lever 521. During a shutter release operation by the shutter release lever 521, subsequent to the abutment of the pointer bearing plate 522 against the pointer 513a in interlocked relationship with the release operation, the release lever 531 is urged by the release pin 521b to rotate, thereby releasing a constraint on the drive wheel 529. A delayed drive lever 532 has its opposite ends folded, forming an abutment piece 532a and a detent piece 532b. An auxiliary lever 533 is pivotally mounted at 533b on the camera body at its center, and has its one end pivotally connected with the delayed drive lever adjacent to the detent piece 532b by means of a pivot pin 533c. The auxiliary lever 533 is urged by a spring 533a having a low spring constant to rotate the end carrying pin 533c toward the drive wheel 529. The delayed drive lever 532 carries an abutment pin 534 intermediate the pivot pin 533c and the abutment piece 532a, which pin 534 is disposed opposite one lateral side of the cam portion 527a of the control lever 527, and a spring 535 urges the pin 534 against the cam portion 527a. A stop 536 is located to bear against the rear portion of the cam portion 527a. The abutment pin 534 is engaged by the tapered arm of a primary gear 537 of a governor assembly for slowing the operation of the delayed drive lever 532. Normally the detent piece 532b lies in the path of travel of the projection 529a of the drive wheel 529, but is moved out of the path when the auxiliary lever 533 is rotated against the force of spring 533a. A holding lever 539 is rotatably mounted on a pivot 539a intermediate its end, and has its one end located in abutment with the abutment piece 532a of the delayed drive lever 532 while its other end, formed as a sliding portion 539b, is located in the path of travel of the drive pin 529b on the drive wheel 529. The holding lever 539 is urged by a spring 541 to resiliently maintain said one end in abutment with the abutment piece 532a against the force of spring 535. An L-shaped set lever 540 is pivotally mounted at 540a at is knee, and has its respective ends located opposite the abutment piece 532a of the delayed drive lever 532 and the set cam 528b, respectively.

A lock lever 538 is rotatably mounted on a pivot 525a intermediate its ends, and has its one end bifurcated to engage a pin 523a on the clamp plate 523 while its other end is formed with a pawl 538a which is adapted to selectively engage a step 521c formed in one lateral side of the shutter release lever 521 for locking a shutter release operation of the lever 521. Thus the pawl 538a engages the step 521c only when the clamp plate 523 rotates without being constrained by the pointer 513a of the meter 513.

The operation of the instant embodiment will now be described. The various parts are shown in FIG. 16 in the positions which they assume subsequent to the completion of a film winding operation. By adjusting a diaphragm ring, not shown, the diaphragm cam 501 is rotated, operating the diaphragm blades 509 through the diaphragm lever 502, pin 511 and the base plate 510 to establish a desired diaphragm aperture in accordance with the amount of rotation of the cam 501. When a shutter button, not shown, is depressed, the shutter release lever 521 moves in the direction of a shutter release operation. Consequently, the connecting lever 525 is initially rotated to establish a position of the control lever 527 which depends on the position of the pointer 513a. Stated differently, a required spacing $l$ is established between the cam portion 527a and the abutment pin 534. On the other hand, the release lever 531 is rotated by the release pin 521b on the lever 521, thereby releasing the drive wheel 529 for rotation. In the course of rotation of the drive wheel, the drive pin 529b slides along the sliding portion 539b of the holding lever 539 to cause it to rotate, and the projection 529a bears against the detent piece 532b of the delayed drive lever 532, whereupon its movement is temporarily interrupted. The delayed drive lever 532 is then released from a constraint by the holding lever 539, and rotates under the action of the spring 535 while being braked by the first primary gear 537 of the governor assembly until the abutment pin 534 bears against the cam portion 527a of the control lever 527, whereupon it continues to rotate about the point of contact between the abutment pin 534 and the cam portion 527a while rotating the auxiliary lever 533. As a consequence, the detent piece 532b of the delayed drive lever 532 is moved out of the path of travel of the projection 529a, whereupon the drive wheel 529 rotates rapidly without constraint.

Figure 18:
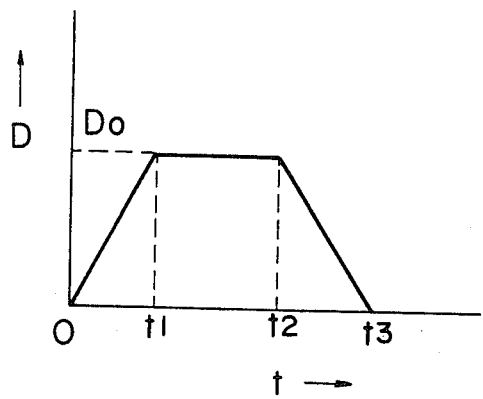
FIG. 18 is a diagram showing the variation of the opening of the shutter against time.

During its rotation, the drive wheel 529 is effective to drive a shutter mechanism, not shown, with its drive pin 529b. The operation of such shutter mechanism is illustrated graphically in FIG. 18 wherein the abscissa represents time t and the ordinate represents an aperture of the shutter D. Initially as the drive pin 529b rotates, the aperture increases gradually until the shutter becomes fully open at time $t_1$ when the projection 529a bears against the detent piece 532b of the delayed drive lever 532, and such maximum aperture is maintained until time $t_2$ when the detent piece 532b is disengaged from the projection 529a, whereupon the shutter begins to close. The aperture is fully closed at time $t_3$. It will be noted that the period of time during which the shutter is maintained fully open depends on the spacing $l$ between the cam portion 527a of the control lever 527 and the abutment pin 534 of the delayed drive lever 532, which spacing $l$ varies with the position of the pointer 513a of meter 513. Thus, the period of time during which the shutter is maintained fully open is controlled in accordance with the position of the pointer of the meter 513 or in accordance with the brightness of an object being photographed and a diaphragm aperture established.

The shutter release lever 521 is returned to its initial position when the shutter button is released. A subsequent film winding operation causes the set gear 528 and the set cam 528b to rotate, again charging the coiled spring 530 by rotating the delayed drive lever 532 in the direction of charging, by the cam 528b through the set lever 540, and thus returning the various parts to their position shown in FIG. 16 in readiness for the next photographic operation.

A flashlight photographing operation using an autostrobo unit will now be described. A switching manipulation for the flashlight photographing, for example, the mounting of an auto-strobo unit, causes the switching lever 503 to rotate against the force of spring 506, whereby its tongue 503e changes the change-over switch 518. Thus a required fixed resistor 517 for the mounted auto-strobo unit is connected in circuit with the battery 515. The FM lever 504 rotates integrally with the switching lever 503, so that its engaging piece 504b is effective to cause the base plate 510 to be rotated through the pin 511, thus allowing a desired diaphragm aperture to be established by the diaphragm blades 509. The meter 513 reponds to the resistance of the fixed resistor 517 and the brightness of an object being photographed as sensed by the photoelectric transducer element 514 to determine a position of the pointer 513a. Upon depression of the shutter button, an operation similar to that described previously occurs, the drive pin 529b driving the shutter mechanism.

With the above embodiment, the diaphragm blades 509 are operated through the diaphragm lever 502 to define an diaphragm aperture, with which the resistance of the variable resistor 516 varies to establish the position of the pointer of the meter 513 in an EE photographic operation. The EE mechanism 520 responds to the position of the pointer to establish a shutter speed automatically. In a flashlight photographic operation, the switching lever is rotated in response to a switching manipulation such as mounting an auto-strobo unit, thereby replacing the variable resistor 516 by the fixed resistor 517, and the position of the pointer of the meter 513 is determined by the resistance of the fixed resistor 517 and the brightness of an object being photographed, thereby automatically establishing a shutter speed through the EE mechanism 520. At the same time, the switching lever 503 and the FM lever 504 operate on the diaphragm blades 509. In this manner, a simple manipulation of switching to a flashlight photographic operation using an auto-strobo unit is sufficient to permit the diaphragm presetting mechanism associated with the flashlight photographic operation to cause the diaphragm mechanism to define a desired diaphragm aperture and also to permit the EE mechanism to cause the shutter mechanism to define a shutter speed in accordance with the position of the meter pointer which responds to a diaphragm aperture established and the brightness of an object being photographed, thus providing an EE camera with a preset diaphragm aperture which is capable of a synchronized photographing during the daytime through the operation of the EE mechanism, by a simple manipulation of switching to a flashlight photographic operation.

Figure 19:
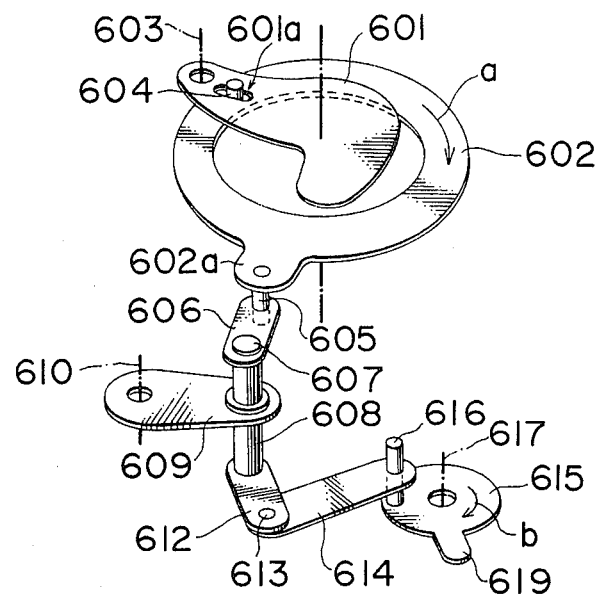
FIG. 19 is a perspective view of a shutter operating mechanism.
Figure 20:
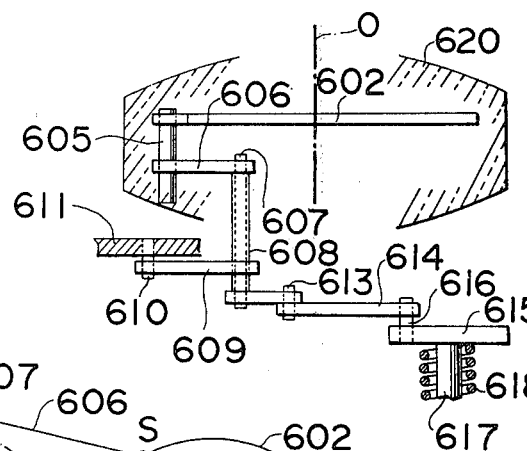
FIG. 20 is a side elevation of the mechanism of FIG. 19.
Figure 21:
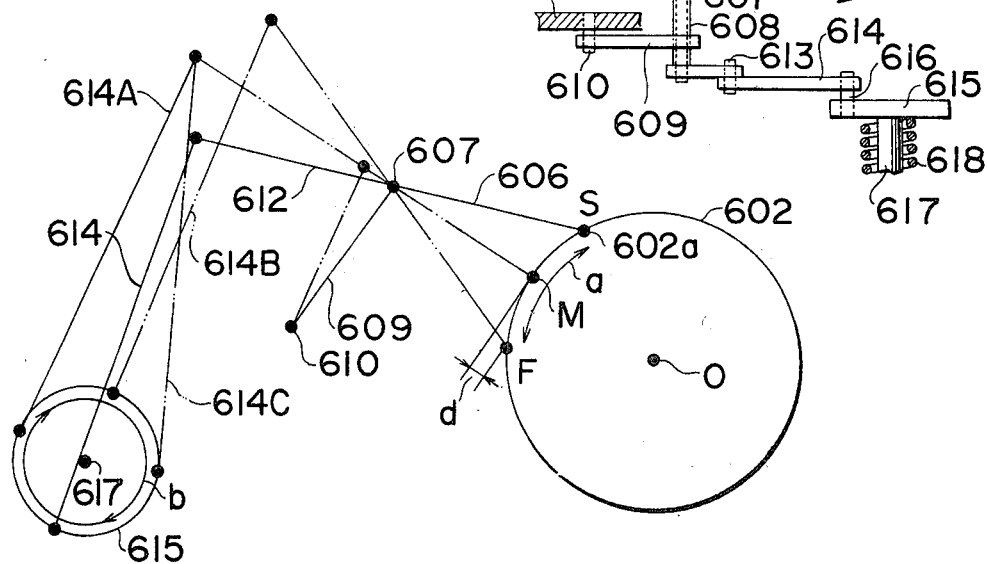
FIG. 21 is a diagram showing the operational relationship between a drive wheel and the base plate for the shutter blades.

Referring to FIGS. 19 to 21, a mechanism for opening and closing shutter blades will be described. Referring to FIG. 19, a plurality of shutter blades 601 (only one being shown) are mounted on an annular base plate 602. The shutter blades 601 are rotatably mounted at their one end on stationary pivots 603, and are provided with elongated slots 601a which are engaged by pins 604 on the base plate 602. Thus, as the base plate 602 is rotated in the direction indicated by an arrow a, the blades are opened, and the rotation of the base plate in the opposite direction closes the shutter blades.

The base plate 602 has an outwardly extending projection 602a carrying a pivot 605 which is pivotally connected with one end of a drive lever 606. The other end of the drive lever 606 is fixed to the upper end of a shaft 607, which is fitted inside a hollow shaft 608. A central portion of the hollow shaft 608 is rotatably carried by one end of a support arm 609, the other end of which is rotatably mounted on a pivot 610 which is fixedly mounted on a stationary wall 611 of the camera as shown in FIG. 20. The lower end of the shaft 607 which extends through the hollow shaft 608 is fixedly connected with one end of an auxiliary lever 612, the other end of which is pivotally connected at 613 with one end of a link 614. The other end of the link 614 is rotatably connected with a pivot 616 which is mounted on a drive wheel 615 adjacent to its outer periphery.

The drive wheel 615 is fixedly mounted on a shaft 617, and is urged to rotate in the direction indicated by an arrow b by a coiled spring 618 which is disposed around the shaft 617, as indicated in FIG. 20. The coiled spring 618 is charged in connection with a film winding operation or the like, and a movement of the drive wheel 615 is locked until a shutter release operation by suitable means which cooperate with a projection 619 thereof. In FIG. 20, it should be noted that the base plate 602 is located within the barrel of a photographic optical system 620 in concentric relationship with the optical axis O.

Upon shutter release, the drive wheel 615 rotates in the direction of the arrow b through one revolution, with its rotational speed being adjusted by a suitable governor. The motional relationship between the drive wheel 615, the base plate 602 and the various parts located therebetween is schematically depicted in FIG. 21. Referring to FIG. 21, as the drive wheel 615 rotates in the direction of the arrow b, the link 614 move from a start position shown in the solid line and passes through positions 614A, 614B and 614C before returning to the start position again. Such motion is transmitted to the base plate 602 through the auxiliary lever 612 and the drive lever 606. Assuming that the pivot 602a of the base plate 602 is at its start position S when the link 614 is in its start position, the pivot 602a will reach an intermediate point M at the position 614A of the link 614, whereby the shutter blades 601 begin to be opened. At the position 614B of the link 614, the pivot 602a will reach the end of stroke position F, and the shutter blades 601 will be fully open at this time. Subsequently, the pivot 602a of the base plate 602 returns to its initial position, whereby the shutter blades 601 are closed.

A feature of this embodiment is that the support arm 609 rocks as the both levers 612 and 606 move, to compensate for the distance d between the point M and the line joining the points S and F. This means that there is no need for the provision in the shutter drive mechanism of some means such as a loose coupling or frictional coupling to compensate for the distance d, thereby enabling an accurate operation and facilitating manufacturing.

Figure 22:
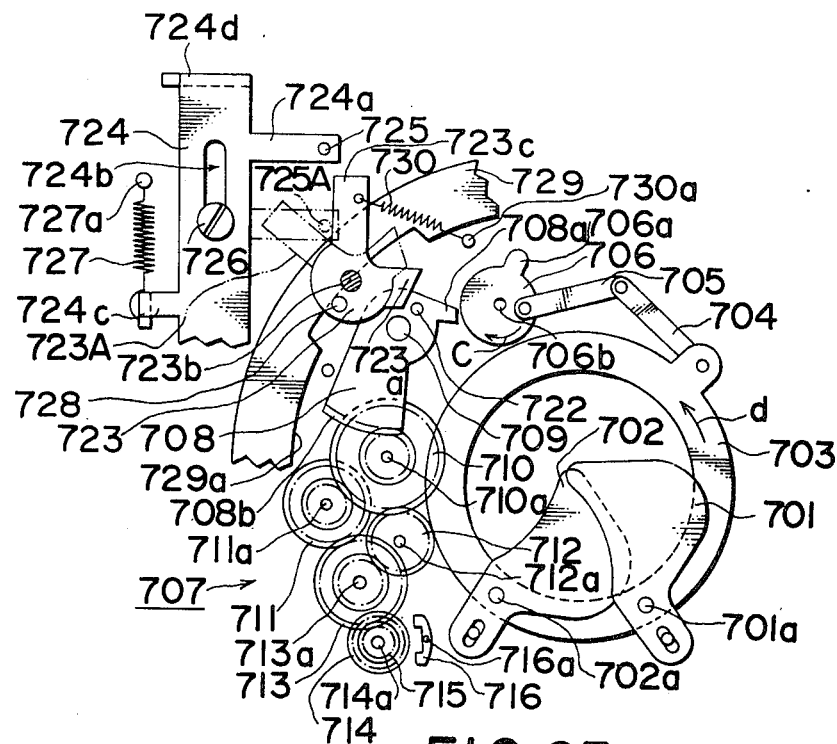
FIG. 22 is a front view of a governor assembly.

Referring to FIGS. 22 to 26, there is shown a shutter drive mechanism which is characterized by its governor assembly. Referring to FIG. 22, a plurality of shutter blades 701, 702 (only two being shown) are connected with a base plate 703 at pivots 701a and 702a, respectively. The base plate 703 is connected with a drive wheel 706 through a drive lever 704 and an auxiliary lever 705. The drive wheel 706 is supported on a pivot 706b and is urged by a coiled spring to rotate in the direction indicated by an arrow c, but is normally prevented from rotation by a detent which selectively abuts its projection 706a. When the projection 706a is released by a shutter release operation, the drive wheel 706 rotates in the direction of the arrow c, rotating the base plate 703 in the direction of an arrow d through the levers 705 and 704 to open the shutter blades 701, 702. When the drive wheel 706 has rotated through one-half revolution, the shutter blades 701, 702 become fully open, and subsequently the base plate 703 rotates in the opposite direction to return to its initial position, closing the shutter blades 701, 702.

Disposed within the path of travel of the projection 706a of the drive wheel 706 is a projection 708a provided on a primary gear 708 of a governor assembly 707, which primary gear 708 is rotatably mounted on a pivot 709 and is formed with a toothed portion 708b which meshes with a small gear of a first double gear 710 comprising a smaller and a larger gear integrally coupled together. The large gear of the double gear 710 meshed with a small gear of a second double gear 711 and with an intermediate gear 712, the latter being meshed with a small gear of a third double gear 713. The large gear of the double gear 713 meshes with a small gear 715 integral with an escape wheel 714, which is located opposite an anchor 716.

Figure 23:
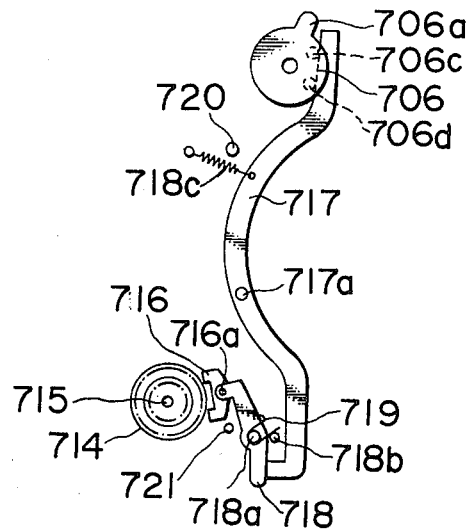
FIG. 23 is a front view of an anchor control mechanism.

As indicated in FIG. 23, adjacent to the periphery on the rear surface of the drive wheel 706 are fixedly mounted pins 706c and 706d, against which one end of an anchor control lever 717 is held in abutment by the action of a spring 718c, the control lever 717 being pivotaily mounted at 717a. The other end of the control lever 717 is located opposite one end of an anchor support lever 718 which is pivotally mounted at 718a, the anchor 716 being pivotally mounted on the other end of the anchor support lever by means of a pivot 716a. A spring 719 engaging the support lever 718 at its one end and engaging a stationary pin 718b at its other end urges the anchor 716 in a direction to engage with the escape wheel 714. However, during the time the drive wheel 706 is at rest and one end of the control lever 717 abuts against the pins 706c and 706d, the support lever 718 is urged by the control lever 717 to move in the opposite direction against the force of spring 719, whereby the anchor 716 is displaced from the escape wheel 714.

Upon shutter release, as the drive wheel 706 commences its rotation, the pins 706c and 706d move away from the anchor control lever 717, so that the anchor control lever 717 rotates into abutment against the stop 720. Thereupon the anchor support lever 718 is rotated into abutment against the stop 721 under the action of the spring 719, thereby engaging the anchor 716 with the escape wheel 714. Subsequently, when the projection 706a of the drive wheel 706 bears against the projection 708a of the primary gear 708 (see FIG. 22), the speed of the drive wheel 706 is adjusted by means of the governor assembly 707, when the projection 706a of the drive wheel 706 is disengaged from the projection 708a of the primary gear 708, the drive wheel 706 returns to its original position at a high speed. When the drive wheel 706 is restored to its original position, the anchor control lever 717 is driven by the pins 706c and 706d to return the anchor support lever 718 to its original position, thereby disengaging the anchor 716 from the escape wheel 714. When the engagement and disengagement between the anchor and the escape wheel is effected by an output derived from the output of the drive wheel 706 itself as in the present embodiment, such engagement and disengagement can be achieved in a positive manner with a sufficient force.

Referring to FIG. 22, the primary gear 708 of the governor assembly carries a pin 722 on its upper portion, and disposed opposite to the pin 722 is a detent portion 723a of a bulb lever 723 which is located above and to the left of the primary gear 708. The lever 723 is pivotally mounted at 723b, and has another arm 723c at which the lever is adapted to be locked. The portion 723c is located opposite a pin 725 fixedly mounted on an arm 724a which extends laterally from the upper portion of a shutter release lever 724. When a flashlight bulb is not used for photographing, the lever 723 is placed at a position 723A shown in phantom line to disengage the detent portion 723a from the pin 722 of the primary gear 708 and to move the portion 723c out of the path of travel of the pin 725 on the shutter release rod 724. The shutter release rod 724 is supported by a pin 726 which is fitted into an elongate slot 724b formed therein, and is urged to move upward by a spring 727 which extends between a stationary pin 727a and an arm 724c of the release rod. The top portion 724d of the release rod is held in abutment against a shutter button, not shown.

A pin 728 is fixedly mounted on the rear side in the lower portion of the bulb lever 723, and is disposed against a cam edge 729a of a shutter dial cam wheel 729. A spring 730 extends between the arm 723c and a stationary pin 730a to urge the lever 723 so as to cause the pin 728 to abut the cam edge 729a.

The cam edge 729a of the cam wheel 729 is positioned so that its recess is engaged by the pin 728 when taking a picture using a flashlight bulb, and thus the bulb lever 723 assumes the position shown in solid line at this time. If the shutter release rod 724 is not depressed, the pin 725 will assume a position 725A shown in phantom line, engaging the back side of the portion 723c to preclude a further counter-clockwise rotation of the lever 723. The drive wheel 706 is rotated under this condition, and when it has rotated to a point such that its projection 706a bears against and moves the projection 708a of the primary gear 708, the shutter blades 701, 702 will become fully open. When the primary gear 708 is further driven, the pin 722 bears against the detent portion 723a of the bulb lever 723, so that a further operation of the governor assembly 707 is prevented since the lever 723 is locked by the pin 725 of the shutter release rod 724. Thus the drive wheel 706 comes to a stop at such position, maintaining the shutter blades 701, 702 fully open. As a result, by maintaining the shutter release rod 724 depressed, the shutter is maintained in its fully open position during such time, enabling a flashlight photographing with a bulb. When an exposure is completed, the shutter release rod 724 may be released to return upward, whereby the bulb lever 723 is released, allowing the governor assembly 707 to operate again so as to permit a rotation of the drive wheel 706 to close the shutter blades 701, 702. The use of the primary gear 708 at an intermediate position to stop the drive wheel 706 in the manner mentioned above avoids the occurrence of shocks as compared with when the drive wheel 706 is directly stopped.

Figure 24:
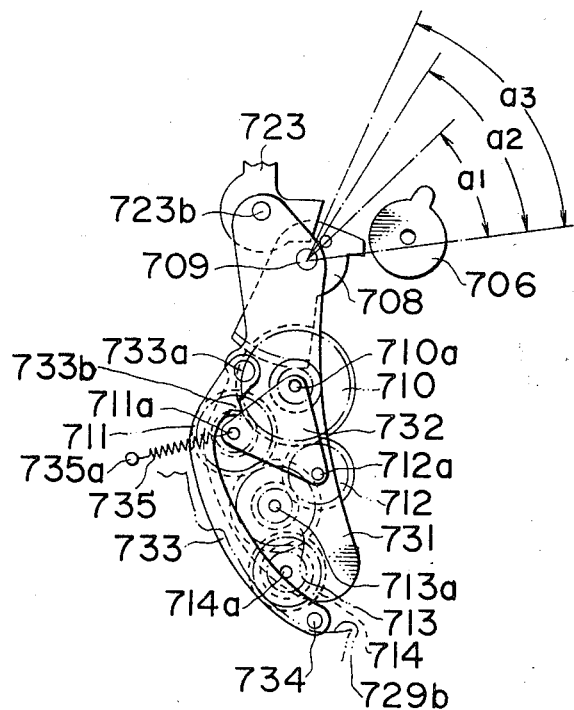
FIGS. 24 to 26 are front views of connection and disconnection means associated with the governor assembly.

Referring to FIG. 24, the pivot 709 of the primary gear 708, the pivot 723b of the bulb lever 723, the pivots 710a, 713a of the first and third double gear 710, 713, the pivot 714a of the escape wheel 714 and the like are all supported by an upper base plate 731 assembled into the camera. Rotatably mounted on the pivot 710a of the first double gear 710 is a triangular-shaped support plate 732 which carries the pivot 711a of the second double gear 711 and the pivot 712a of the intermediate gear 712. In the region of the pivots 711a and 712a, an arcuate slot, not shown, which is centered about the pivot 710a is formed in the upper base plate 731 to permit a rocking displacement of the support plate 732 as well as the pivots 711a, 712a about the pivot 710a.

A switching lever 733 has its one end rotatably mounted on a pivot 733a which is located on the left-hand side of the upper base plate 731 centrally thereon, and carries a pin 734 on its free end which is held in abutment against a switching cam edge 729b of the shutter dial cam wheel 729. On its upper portion, the switching lever 733 is provided with a projection 733b, against which the lateral edge of the support plate 732 bears under the action of a spring 735 which extends between the support plate 732 and a stationary pin 735a.

Figure 25:
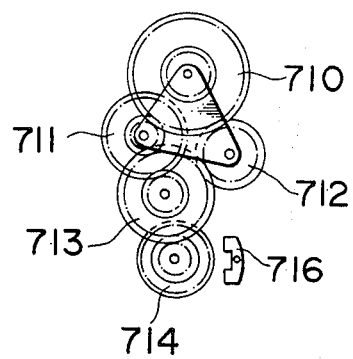
Figure 26:
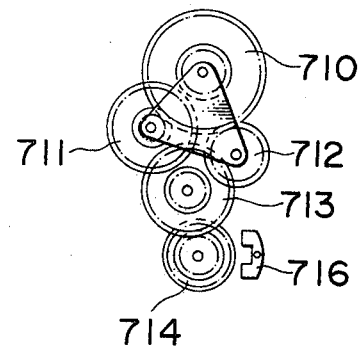

In the position shown in FIGS. 22 and 24, the third double gear 713 meshes with the intermediate gear 712 to permit a control of moderate shutter speeds on the order of 1/100 second. Alternatively, when the shutter dial cam wheel 729 is operated to displace the switching lever 733 so that the third double gear 713 meshes with the second double gear 711 as indicated in FIG. 25, a control a low shutter speeds less than about 1/50 second is permitted. As a further alternative, when the third double gear 713 is located out of meshing engagement with either second double gear 711 or intermediate gear 712 as indicated in FIG. 26, the governor action by means of the escape wheel 714 and the anchor 716 is interrupted at the third double gear 713, whereupon the governor assembly only applies a very slight braking to the drive wheel 706, thereby permitting a control of high shutter speeds in excess of 1/250 second.

When the parts located in the region from the third double gear 713 to the anchor 716 are excluded from the operation in a high speed control, a stabilization can be achieved while maintaining a good accuracy at the maximum speed or even at a next step shutter speed, for example, a shutter speed on the order of 1/250 second. Specifically, as the shutter speed increases, the deflection of the primary gear 708 will increase gradually from an angle $a_1$ to angles $a_2$ and $a_3$ ($a_1 < a_2 < a_3$), thereby reducing the degree of meshing engagement with the first double gear 710. At a shutter speed which is next to the maximum speed, the angle will be $a_3$ at which time the degree of meshing engagement will be minimum. If all of the gears in the governor assembly are engaged with the primary gear 708 at this time, it is likely that the primary gear 708 can not operate properly because of the reduced meshing engagement. The present embodiment completely eliminates such problem.

What is claimed is:

1. An electric eye exposure camera comprising:
   shutter means comprising a plurality of shutter blades; means for opening and closing said shutter blades at a variable speed;
   diaphragm means comprising a plurality of diaphragm blades; means for actuating said diaphragm blades to form an aperture of variable size;
   an electric eye exposure meter having a pointer, said pointer having a variable deflection from a reference point responsive to the brightness of an object being photographed;
   a pointer bearing plate adapted to abut against said pointer to detect said deflection angle;
   a clamp plate cooperating with said pointer bearing plate to abut against said pointer prior to the abutment of said pointer bearing plate therewith;
   a drive mechanism interlocked with said pointer bearing plate;
   a governor assembly operatively coupled to said drive mechanism; and
   a switching mechanism for selectively coupling at least one of said shutter means and said diaphragm means to said drive mechanism and said governor assembly, thereby establishing at least one of said variable shutter speed and said variable aperture size for a proper exposure responsive to said deflection angle.

2. An electric eye exposure camera according to claim 1, wherein said clamp plate further comprises a pair of pointer bearing surfaces formed in a stepped manner, a first one of said pair of pointer bearing surfaces having a width chosen to be coincident with an effective deflection angle range of said meter pointer within which range a proper exposure can be established for a programmed electric eye operation, a second one of said pair of pointer bearing surfaces having a width chosen to be coincident with an effective deflection angle range of said meter pointer for establishing a proper amount of exposure for an unprogrammed photographic operation;
   a shutter release lever;
   an exposure locking mechanism adapted to lock said shutter release lever; and
   a function select lever operatively coupling one of said first and second pointer bearing surfaces of said clamp plate to said exposure locking mechanism to cause said shutter release lever to be locked whenever said meter pointer is deflected beyond the range of the width of the pointer bearing surface selected by said function select lever.

3. An electric eye exposure camera according to claim 1, further comprising an urging lever interlocked with said pointer bearing plate; an exposure presetting lever operatively coupled to said diaphragm means to vary the size of said aperture; and a switching mechanism for adjustably setting the range of deflection of said meter pointer over which said urging lever contacts said exposure presetting lever to vary said aperture size.

4. An electric eye camera according to claim 1, further comprising an auto-strabo flash unit; means for mounting said auto-strobo flash unit on said camera; and a switching lever coupled between said mounting means and said diaphragm blade actuating means and adapted to adjust said diaphragm aperture to a preselected value responsive to said auto-strobo flash unit being mounted to said mounting means.

5. An electric eye exposure camera according to claim 1, wherein said shutter opening and closing means comprises a drive wheel; a shutter drive lever; an auxiliary lever pivotally connecting the shutter drive lever with the drive wheel; and a pivotally mounted arm rockably supporting the pivotal connection between the shutter drive lever and the auxiliary lever.

6. An electric eye exposure camera according to claim 1, wherein said governor assembly comprises a primary gear; an anchor; at least one other gear normally meshed with said primary gear and said anchor; and switching means for selectively initially disconnecting said at least one other gear from said anchor to increase the speed of said shutter and for further selectively disconnecting said at least one other gear from said primary gear to further increase said shutter speed.

7. An electric eye exposure camera comprising:
shutter means comprising a plurality of shutter blades; means for opening and closing said shutter blades at a variable speed;
diaphragm means comprising a plurality of diaphragm blades; means for actuating said diaphragm blades to form an aperture of variable size;
an electric eye exposure meter having a pointer, said pointer having a variable deflection from a reference point responsive to the brightness of an object being photographed;
a pair of pointer bearing plates adapted to abut against sad pointer to detect said deflection angle;
a clamp plate cooperating with each of said pair of pointer bearing plates to abut against said pointer prior to the abutment of at least one of said pair of pointer bearing plates therewith;
a first exposure meter interlock mechanism coupled between said clamp plate, a first one of said pair of pointer bearing plates and said shutter means for controlling the shutter speed responsive to the deflection of said pointer;
a second exposure meter interlock mechanism coupled between a remaining one of said pair of pointer bearing plates, said clamp plate and said diaphragm means for controlling the size of the diaphragm aperture responsive to the deflection of said pointer;
a switching lever coupled to said first and second interlocked mechanisms and adapted to selectively prevent actuation of a selected one of said first and second interlocked mechanisms;
a drive mechanism interlocked with said first exposure meter interlocked mechanism for driving at least one of said shutter means and said diaphragm means;
a governor assembly cooperating with said drive mechanism to set the speed thereof; and
switching means for selectively connecting said governor assembly and drive mechanism to said shutter opening and closing means through one of a direct connection and said first exposure meter interlocked mechanism.

8. An electric eye exposure camera comprising:
a plurality of shutter blades;
a diaphragm ring;
a plurality of diaphragm blades operatively coupled to said diaphragm ring to define an aperute of variable size responsive to the amount of rotation of said diaphragm ring;
an electric eye exposure meter having a pointer, said pointer having a variable deflection from a reference point responsive to the brightness of an object being photographed;
a shutter release mechanism;
a shutter drive mechanism for operating said plurality of said shutter blades at a variable speed in response to an actuation of said shutter release mechanism;
a shutter speed presetting mechanism coupled to said shutter drive mechanism for establishing a shutter speed responsive to the position of said pointer, said shutter speed presetting mechanism adapted to be operatively coupled to said shutter drive mechanism responsive to the actuation of said shutter release mechanism;
a diaphragm drive mechanism coupled to said shutter drive mechanism through said shutter speed presetting mechanism for driving said diaphragm ring and said diaphragm blades;
a governor assembly;
a shutter ring interlocked with said governor assembly and adapted to selectively engage one of said diaphragm and shutter drive mechanisms;
a diaphragm presetting mechanism coupled to said diaphragm ring to establish a diaphragm aperture in accordance with the position of said pointer and responsive to the actuation of said shutter release mechanism; and
a photographic operation switching mechanism for selectively preventing actuation of either one or both of said diaphragm and shutter speed presetting mechanisms.

9. An electric eye exposure apparatus for a bladed shutter camera comprising: a plurality of shutter blades; a plurality of diaphragm blades; a meter having a pointer, the position of said pointer varying with the brightness of an object being photographed; a shutter release mechanism; a diaphragm presetting mechanism responsive to an operation of said shutter release mechanism for establishing a diaphragm aperture defined by the diaphragm blades in accordance with the position of the pointer; a shutter speed presetting mechanism responsive to the diaphragm presetting mechanism; a shutter drive responsive to said operation of said shutter release mechanism for driving the shutter blades; a diaphragm drive mechanism driven by the shutter drive mechanism through the shutter speed presetting mechanism for driving the diaphragm blades; a photographic operation switching mechanism for selectively releasing the engagement between the shutter drive mechanism and the diaphragm blades; and a governor assembly engaging with the diaphragm drive mechanism and responsive to the shutter drive mechanism for exercising a buffering function to temporarily retard said shutter drive mechanism; said photographic operations switching mechanism being constructed so as to selectively release the engagement between the shutter drive mechanism and the diaphragm mechanism and to engage the governor assembly with the shutter drive mechanism; the buffering function of the governor assembly being exercised before the shutter blades are opened by the shutter drive mechanism.

\* \* \* \* \*